US011983645B2

(12) United States Patent
Volkov et al.

(10) Patent No.: US 11,983,645 B2
(45) Date of Patent: *May 14, 2024

(54) AGENT APTITUDE PREDICTION

(71) Applicant: WorkFusion, Inc., New York, NY (US)

(72) Inventors: Andrii Volkov, New York, NY (US); Maxim Yankelevich, New York, NY (US); Mikhail Abramchik, New York, NY (US); Abby Levenberg, New York, NY (US)

(73) Assignee: Workfusion, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,708

(22) Filed: Jul. 30, 2021

(65) Prior Publication Data

US 2021/0357790 A1     Nov. 18, 2021

Related U.S. Application Data

(63) Continuation of application No. 15/588,530, filed on May 5, 2017, now Pat. No. 11,080,608.

(Continued)

(51) Int. Cl.
*G06N 5/04* (2023.01)
*G06N 3/006* (2023.01)
(Continued)

(52) U.S. Cl.
CPC .............. *G06N 5/04* (2013.01); *G06N 3/006* (2013.01); *G06N 7/01* (2023.01); *G06N 20/00* (2019.01)

(58) Field of Classification Search
None
See application file for complete search history.

(56) References Cited

U.S. PATENT DOCUMENTS

| 11,386,456 | B1 * | 7/2022 | Lightbody | G06Q 30/0641 |
| 2017/0236070 | A1 * | 8/2017 | Xu | G06N 20/00 |
| | | | | 706/12 |
| 2021/0097446 | A1 * | 4/2021 | Kim | G06N 5/01 |

OTHER PUBLICATIONS

Duan et al., "A multi-agent reinforcement learning approach to robot soccer", Springer Science+Business BV 2011, all pages (Year: 2011).*

(Continued)

*Primary Examiner* — Daniel C Puentes
(74) *Attorney, Agent, or Firm* — Baker Botts L.L.P.

(57) ABSTRACT

In one or more embodiments, one or more methods, processes, and/or systems may receive data associated with completion of tasks by agents. Each task corresponds to a category of tasks and is associated with an outcome relative to satisfaction of a specification of performance by a work distributor. An aptitude prediction model is trained to map, for each category of task, a correlation between an outcome corresponding to satisfaction of the specification of performance and one or more aspects of each task and one or more attributes of each agent that has completed the task. An aptitude of each agent towards a category of tasks is determined. A probability that a first agent will complete a first task in a manner specified by the work distributor is predicted using the trained aptitude prediction model. Identification information of the first agent is provided for display in association with the determined probability.

22 Claims, 20 Drawing Sheets

Related U.S. Application Data

(60) Provisional application No. 62/332,827, filed on May 6, 2016.

(51) Int. Cl.
 *G06N 7/01* (2023.01)
 *G06N 20/00* (2019.01)

(56) References Cited

OTHER PUBLICATIONS

Sergio et al., "Dynamic selection of forecast combiners", 2016, Elsevier, all pages (Year: 2016).*
Duan et al, "A multi-agent reinforcement learning approach to robot soccer", Jun. 2011, Springer, all pages (Year: 2011).*
Feurer et al., "Efficient and Robust Automated Machine Learning", 2015, NIPS, all pages (Year: 2015).*

* cited by examiner $$\alpha_{ii}^{(wp)} = m^{(wp)}\beta^{(wp)}, \quad (1)$$

$$\alpha_{ij}^{(wp)} = \frac{m^{(wp)}(1-\beta^{(wp)})}{J-1} \text{ for } i \neq j. \quad (2)$$

Note that, for all $i$, $$\sum_{j=1}^{J} \alpha_{ij} = m$$

and the prior confusion matrix, $\pi$, is Dirichlet distributed, $$p(\pi \mid m\beta, m(1-\beta)) = \prod_{j} \left\{ \frac{1}{B_J(m\beta, m(1-\beta))} \pi_{jj}^{m\beta-1} \prod_{k \neq j} \pi_{jk}^{m(1-\beta)/(J-1)-1} \right\} \quad (3)$$

where $B$ is the Beta function, $$B_J(m\beta, m(1-\beta)) = \frac{\Gamma(m\beta)\Gamma(m(1-\beta)/(J-1))^{J-1}}{\Gamma(m)}$$

FIG. 1A $$\beta_*^{(wp)} \sim N(G^{(w)} * B^{(p)} + M^{(w)}, S^{(w)})$$
$$\beta^{(wp)} = \sigma(\beta_*^{(wp)})$$

FIG. 1B

| | |
|---|---|
| $W$ | Number of workers. |
| $P$ | Number of questions. |
| $N_p$ | Number of items question $p$ is applied to. |
| $J_p$ | Number of answers to question $p$ (two in current Workfusion data). |
| $t_i^{(p)}$ | True answer of the $i^{th}$ item for question $p$. |
| $c_i^{(wp)}$ | Worker $w$'s answer to question $p$ for the $i^{th}$ item. |
| $\kappa^{(p)}$ | Probability of item class (i.e. true answer) to question $p$. |
| $J_p$ | Number of classes for question $p$ (2 possibilities in the Workfusion data to date). |
| $F$ | Size of the question and worker skill feature-vectors. |
| $N_j^{(p)}$ | Pseudo count of items with answer $j$ to question $p$. |
| $N_{jl}^{(wp)}$ | Pseudo count of worker $w$'s answer $l$ to question $p$ for items of class $j$. |

FIG. 1C $$p(\kappa, \pi, \beta, m, t, c, B, G, S \mid \epsilon_0, \tau_0, l_0, \theta_0, \mu_{G0}, \mu_{B0}, \mu_{M0}, P_{G0}, P_{B0}, \nu_0, P_{M0}) =$$
$$p(c \mid \pi, t) p(\pi \mid \beta, m) p(\beta_* \mid B, G, M, S) p(t \mid \kappa) \times$$
$$p(\kappa \mid \nu_0) p(m \mid \epsilon_0, \tau_0) p(G \mid \mu_{G0}, P_{G0}) p(B \mid \mu_{B0}, P_{B0}) p(M \mid \nu_{M0}, P_{M0}) p(S \mid l_0, \theta_0)$$

where, $$p(c \mid \pi, t) = \prod_{w=1}^{W} \prod_{p=1}^{P} \prod_{i=1}^{N_p} (\pi_{c_i^{(wp)}}^{(wp)})^{t_i^{(wp)}},$$

$$p(\pi \mid \beta, m) = \prod_{w=1}^{W} \prod_{p=1}^{P} \prod_{j=1}^{J_p} \mathrm{Dir}(\pi_j^{(wp)} \mid m^{(wp)} \beta^{(wp)}, m^{(wp)}(1 - \beta^{(wp)})),$$

$$p(m \mid \epsilon_0, \tau_0) = \prod_{w=1}^{W} \prod_{p=1}^{P} \mathrm{Gam}(m^{(wp)} \mid \epsilon_0, \tau_0),$$

$$\beta^{(wp)} = 1/(1 + \exp -\beta_*^{(wp)}),$$

$$p(\beta_* \mid B, G, M, S) = \prod_{w=1}^{W} \prod_{p=1}^{P} \mathrm{N}(\beta_*^{(wp)} \mid G^{(w)} * B^{(p)} + M^{(w)}, S^{(w)}), \quad (4)$$

$$p(\kappa \mid \nu_0) = \prod_{p=1}^{P} \mathrm{Dir}(\kappa^{(p)} \mid \nu_0),$$

$$p(t \mid \kappa) = \prod_{p=1}^{P} \prod_{i=1}^{S_p} \kappa_{t_i^{(p)}}^{(p)},$$

$$p(G \mid \mu_{G0}, P_{G0}) = \prod_{w=1}^{W} \mathrm{N}(G^{(w)} \mid \mu_{G0}, P_{G0}),$$

$$p(B \mid \mu_{B0}, P_{B0}) = \prod_{p=1}^{P} \mathrm{N}(B^{(p)} \mid \mu_{B0}, P_{B0}),$$

$$p(M \mid \mu_0, P_{M0}) = \prod_{w=1}^{W} \mathrm{N}(M^{(w)} \mid \mu_{M0}, P_{M0}),$$

$$p(S \mid l_0, \theta_0) = \prod_{w=1}^{W} \mathrm{Ga}(S^{(w)} \mid l_0, \theta_0).$$

FIG. 2

$$p(\kappa, \pi, \beta, m, t, B, G, S \mid c, c_0, \eta_0, \mu_0, L_0, \theta_0, P_{G0}, P_{B0}, \nu_0, P_{M0}) \approx$$

$$= \prod_{p=1}^{P} q(\kappa^{(p)}) q(B^{(p)}) q(t^{(p)}) \prod_{w=1}^{W} \left\{ q(\beta^{(wp)}) q(\pi^{(wp)}) q(m^{(wp)}) \right\} q(G^{(w)}) q(M^{(w)}) q(S^{(w)}) \,.$$

(5)

We assume that, $$q(\kappa^{(p)}) = \mathrm{Dir}(\nu_1^{(p)}, \ldots, \nu_{J_p}^{(p)}) \,,$$
$$q(\pi_j^{(wp)}) = \mathrm{Dir}(\alpha_1^{(wp)}, \ldots, \alpha_{J_p}^{(wp)}) \,,$$
$$q(m^{(wp)}) = \mathrm{Gam}(m^{(wp)} \mid c^{(wp)}, \eta^{(wp)}) \,,$$
$$q(M^{(w)}) = N(M^{(w)} \mid \overline{M^{(w)}}, P_M^{(w)}) \,,$$
$$q(G^{(w)}) = N(G^{(w)} \mid \overline{G^{(w)}}, P_G^{(w)}) \,,$$
$$q(B^{(p)}) = N(B^{(p)} \mid \overline{B^{(p)}}, P_B^{(p)}) \,,$$
$$q(S^{(w)}) = \mathrm{Ga}(S^{(w)} \mid l^{(w)}, \theta^{(w)}) \,.$$

Consequently, $$\log q(m^{(wp)}) = \left\{ \sum_{j=1}^{J_p} \left\{ m^{(wp)} \left( \beta^{(wp)} E_\pi[\log(\pi_{jj}^{(wp)})] + \frac{(1-\beta^{(wp)})}{J_p - 1} \sum_{l,l\neq j}^{J_p} E_\pi[\log(\pi_{jl}^{(wp)})] \right) \right.\right.$$
$$\left.\left. -J_p E_{\beta^{(wp)}}[\log B_{J_p}(m^{(wp)}\beta^{(wp)}, m^{(wp)}(1-\beta^{(wp)}))] \right\} + \log p(m^{(wp)} \mid c_0, \eta_0) \right] + \mathrm{const} \,.$$

The log beta function above is closely approximated by the following, $$\log B_{J_p}(m\beta, m(1-\beta)) \approx U_{b,J_p}(\beta) \log m + V_{b,J_p}(\beta)m + W_{b,J_p}(\beta) \,. \tag{6}$$

FIG. 3A $$E_\beta[\log B_{J_p}(m\beta, m(1-\beta))] = E[U_{b,J_p}(\beta)]\log m + E[V_{b,J_p}(\beta)]m + E[W_{b,J_p}(\beta)]$$

FIG. 3B where $E[U_{b,J_p}(\beta)]$ etc are evaluated numerically. Defining, $$\Pi_m^{(wp)} = \sum_{j=1}^{J_p} \left( \beta^{(wp)} E_\pi[\log(\pi_{jj}^{(wp)})] + \frac{(1-\beta^{(wp)})}{J_p - 1} \sum_{k \neq j}^{J_p} E_\pi[\log(\pi_{jk}^{(wp)})] \right)$$

we have, $$\log q(m^{(wp)}) = \left\{ m^{(wp)} \Pi_m^{(wp)} - J_p [E_\beta[U_{b,J_p}^{(wp)}(\beta)] \log m^{(wp)} + E_\beta[V_{b,J_p}^{(wp)}(\beta)] m^{(wp)} + E_\beta[W_{b,J_p}^{(wp)}(\beta)]] \right\}$$
$$+ (c_0 - 1) \log m^{(wp)} - \frac{m^{(wp)}}{\eta_0} + \text{const}.$$

Thus, $q(m)$ is approximately a Gamma distribution with parameters, $$c^{(wp)} = c_0 - J_p E_\beta[U_{b,J_p}^{(wp)}(\beta)]. \qquad (7)$$

$$\frac{1}{\eta^{(wp)}} = \frac{1}{\eta_0} + (J_p E_\beta[V_{b,J_p}^{(wp)}(\beta)] - \Pi_m^{(wp)}). \qquad (8)$$

Furthermore, $$\log q(\beta^{(wp)}) = \left\{ \sum_{j=1}^{J_p} \left[ m^{(wp)} \left( \beta^{(wp)} E_\pi[\log(\pi_{jj}^{(wp)})] + \frac{(1-\beta^{(wp)})}{J_p - 1} \sum_{k \neq j}^{J_p} E_\pi[\log(\pi_{jk}^{(wp)})] \right) \right] \right.$$
$$\left. - J_p E_{m^{(wp)}}[\log B_{J_p}(m^{(wp)} \beta^{(wp)}, m^{(wp)}(1-\beta^{(wp)}))] \right\}$$
$$- \frac{E[S^{(w)}]}{2} \left( (\beta_*^{(wp)})^2 - 2\beta_*^{(wp)} (E(G^{(w)}) * E(B^{(p)}) + E[M^{(w)}]) \right)$$
$$+ \beta_* + 2(1 + \exp(-\beta_*)) + \text{const}$$

where $\beta_* = -\log\left(\frac{1}{\beta} - 1\right)$ and we use, $$\log p(\beta) = \log \left[ p(\beta_*) \frac{d\beta_*}{d\beta} \right] = \log p(\beta_*) + \beta_* + 2(1 + \exp(-\beta_*)).$$

As per (6), the expectation of the log $\beta$ function is approximated, $$E_m[\log B_{J_p}(m\beta, m(1-\beta))] \approx U_{b,J_p}(\beta) E[\log m] + V_{b,J_p}(\beta) E[m] + W_{b,J_p}(\beta)$$

FIG. 4

$$\log q(\kappa^{(p)}) = E\left[\left[\sum_{i=1}^{N_p} \log \kappa_{t_i^{(p)}}^{(p)}\right] + \sum_{p=1}^{P} \log p(\kappa^{(p)} \mid \nu_0)\right] + \text{const}$$

$$= \sum_{j=1}^{J_v} \left[N_j^{(p)} \log \kappa_j^{(p)} + (\nu_0 - 1) \log \kappa_j^{(p)}\right] + \text{const}$$

where, $$N_j^{(p)} = \sum_{i=1}^{N_p} E_q[t_i^{(p)} = j],$$

Therefore, $$\nu_j^{(p)} = \nu_0 + N_j^{(p)}.$$

By Equation (5)

$$\log q(t_i^{(p)} = j) = E_\kappa[\log \kappa_j^{(p)}] + \sum_{m=1}^{W} E_\pi[\log \pi_{j,c_{i,m}^{(p)}}^{(mp)}] + \text{const}$$

where, $$E[\log \kappa_j^{(p)}] = \Psi(\nu_j^{(p)}) - \Psi\left(\sum_{j=1}^{J_v} \nu_j^{(p)}\right),$$

$$E[\log \pi_j^{(mp)}] = \Psi(\alpha_j^{(mp)}) - \Psi\left(\sum_{j=1}^{J_v} \alpha_j^{(mp)}\right)$$

so that $$p(t_i^{(p)} = j) = E_q[t_i^{(p)} = j] = \frac{q(t_i^{(p)} = j)}{\sum_{j=1}^{J_v} q(t_i^{(p)} = j)}.$$

FIG. 5

$$\log q(\pi_j^{(sp)}) = \left( \sum_{i=1}^{N_p} E_t[t_i^{(p)} = j] \log \pi_{z_{i(p)}}^{(sp)} + E\left[ \log p(\pi_j^{(wp)} \mid m^{(wp)}\beta^{(wp)}, m^{(wp)}(1-\beta^{(wp)}))\right]\right)$$
$$+ \text{const} ,$$
$$= \left( \sum_{i=1}^{J_p} N_j^{(sp)} \log \pi_j^{(sp)} + \sum_{l=1}^{J_p} (m^{(wp)}\bar{\beta}_{jl}^{(wp)} - 1) \log \pi_j^{(sp)} \right) + \text{const}$$

where $\bar{\beta}_{jj} = \beta$ and $\bar{\beta}_{jl} = (1-\beta)/(J_p - 1)$ when $j \neq l$. Therefore, $$\alpha_{jj}^{(sp)} = m^{(wp)}\beta^{(wp)} + N_j^{(sp)},$$
$$\alpha_{jl}^{(sp)} = m^{(wp)}(1 - \beta^{(wp)})/(J_p - 1) + N_j^{(sp)}$$

where $j \neq l$ and, $$N_j^{(sp)} = \sum_{i=1}^{N_p} [t_i^{(sp)} = j] E_t[t_i^{(p)} = j] .\qquad(9)$$

The worker competence, $M$, is drawn from a normal distribution, $$q(M^{(w)}) = N(M^{(w)} \mid \overline{M^{(w)}}, P_M^{(w)})$$

and therefore, $$\frac{1}{P_M^{(w)}} = \overline{PS^{(w)}} + \frac{1}{P_{M0}} ,$$
$$\overline{M^{(w)}} = P_M^{(w)} \left[ \overline{S^{(w)}} \sum_{p=1}^{P} \left\{ \overline{\beta_i^{(wp)}} - \overline{G^{(w)}B^{(p)}} \right\} + P_{M0}^{-1}\mu_0 \right] .$$

Also, the question and worker feature-vectors are drawn from multi-variate normal distributions, $$q(G^{(w)}) = N(G^{(w)} \mid \overline{G^{(w)}}, P_G^{(w)}) ,$$
$$q(B^{(p)}) = N(B^{(p)} \mid \overline{B^{(p)}}, P_B^{(p)}) .$$

FIG. 6

$$(P_G^{(w)})^{-1} = P_{G0}^{-1} + \overline{S^{(w)}} \sum_{p=1}^{P} (P_B^{(p)} + \overline{B^{(p)}}\,\overline{B^{(p)}}^T),$$

$$\overline{G^{(w)}} = P_G^{(w)} \left[ \overline{S^{(w)}} \left\{ \sum_{p=1}^{P} \overline{\beta_*^{(wp)}} - \overline{M^{(w)}}\,\overline{B^{(p)}} \right\} + P_{G0}^{-1}\mu_{G0} \right],$$

$$(P_B^{(p)})^{-1} = P_{B0}^{-1} + \sum_{w=1}^{W} \overline{S^{(w)}}(P_G^{(w)} + \overline{G^{(w)}}\,\overline{G^{(w)}}^T),$$

$$\overline{B^{(p)}} = P_B^{(p)} \left[ \sum_{w=1}^{W} \left\{ \overline{S^{(w)}}\,\overline{\beta_*^{(wp)}} - \overline{M^{(w)}}\,\overline{G^{(w)}} \right\} + P_{B0}^{-1}\mu_{B0} \right].$$

The accuracy precision, $S$, is drawn from a Gamma distribution, $$q(S^{(w)}) = \text{Ga}(S^{(w)} \mid t^{(w)}, \theta^{(w)})$$

and therefore, $$t^{(w)} = t_0 + \frac{P}{2},$$

$$\frac{1}{\theta^{(w)}} = \frac{1}{\theta_0} + \frac{1}{2} \sum_{p=1}^{P} \left\{ \overline{[\beta_*^{(wp)}]^2} + \overline{[G^{(w)} * B^{(p)}]^2} + \overline{[M^{(w)}]^2} \right.$$

$$\left. -2(\overline{\beta_*^{(wp)}} - \overline{M^{(w)}})\,\overline{G^{(w)} * B^{(p)}} - 2\overline{M^{(w)}}\,\overline{\beta_*^{(wp)}} \right\}$$

where, $$\overline{[G^{(w)} * B^{(p)}]^2} = E[\text{Tr}([G^{(w)}]^T B^{(p)} [B^{(p)}]^T G^{(w)})]$$
$$= E[\text{Tr}(G^{(w)} [G^{(w)}]^T B^{(p)} [B^{(p)}]^T)]$$
$$= \text{Tr}((P_G^{(w)} + \overline{G^{(w)}}\,\overline{[G^{(w)}]^T})(P_B^{(p)} + \overline{B^{(p)}}\,\overline{[B^{(p)}]^T})),$$

$$\overline{(M^{(w)})^2} = P_m^{(w)} + \overline{M^{(w)} M^{(w)}}^T$$

and, $$\overline{S^{(w)}} = t^{(w)} \theta^{(w)}.$$

$$\epsilon^{(w)} = \epsilon_0 - \sum_{p=1}^{P} J_p E_\beta [U_{t_p}^{(wp)}(\beta)],$$

$$\frac{1}{\eta^{(w)}} = \frac{1}{\eta_0} + \sum_{p=1}^{P} (J_p E_\beta [V_{t_p}^{(wp)}(\beta)] - \Pi_m^{(wp)}).$$

$$p(\beta_* \mid B, G, M, S, D_T) = \prod_{w=1}^{W} \prod_{p=1}^{P} \prod_{b} N(\beta_*^{(w,p,b)} \mid (G^{(w)} * B^{(p)} + M^{(w)}) \times (D_T^{(w,p)})^{T_m(b)}, S^{(w)}).$$

$$p(\beta_* \mid B, G, M, S, D_T, D_A) =$$
$$\prod_{w=1}^{W} \prod_{p=1}^{P} \prod_{b} N(\beta_*^{(w,p,b)} \mid (G^{(w)} * B^{(p)} + M^{(w)}) \times (D_T^{(w,p)})^{T_m(b)} \times (D_A^{(w,p)})^{A_m(b)}, S^{(w)}).$$

$$p(\kappa, \pi, \beta, m, t, c, B, G, S, D_A, D_T \mid \epsilon_0, \eta_0, l_0, \theta_0, \mu_{G0}, \mu_{B0}, \mu_{M0}, P_{G0}, P_{B0}, \nu_0, P_{M0}, l_{T0}, \theta_{T0}, l_{A0}, \theta_{A0}) =$$
$$p(c \mid \pi, t)p(\pi \mid \beta, m)p(\beta_* \mid B, G, M, S, D_T, D_A)p(t \mid \kappa)p(\kappa \mid \nu_0)p(m \mid \epsilon_0, \eta_0) \times$$
$$p(G \mid \mu_{G0}, P_{G0})p(B \mid \mu_{B0}, P_{B0})p(M \mid \nu_{M0}, P_{M0})p(S \mid l_0, \theta_0) \times$$
$$p(D_T \mid l_{T0}, \theta_{T0})p(D_A \mid l_{A0}, \theta_{A0})$$

FIG. 11C

$$p(c \mid \pi, t) = \prod_{w=1}^{W}\prod_{p=1}^{P}\prod_{i=1}^{N_p}\prod_{b}(\pi_{t_i^{(p)},c_i^{(wp)}}^{(wpb)})^{\{T_i^{(wp)}\in T(b) \wedge A_i^{(wp)}\in A(b)\}},$$

$$p(\pi \mid \beta, m) = \prod_{w=1}^{W}\prod_{p=1}^{P}\prod_{j=1}^{J_p}\prod_{b}\mathrm{Dir}(\pi_j^{(wpb)} \mid m^{(wp)}\beta^{(wpb)}, m^{(wp)}(1-\beta^{(wpb)})),$$

$$p(m \mid \epsilon_0, \eta_0) = \prod_{w=1}^{W}\prod_{p=1}^{P}\mathrm{Gam}(m^{(wp)} \mid \epsilon_0, \eta_0),$$

$$\beta^{(wpb)} = 1/(1+\exp-\beta_x^{(wpb)}),$$

$$p(\kappa \mid \nu_0) = \prod_{p=1}^{P}\mathrm{Dir}(\kappa^{(p)} \mid \nu_0),$$

$$p(t \mid \kappa) = \prod_{p=1}^{P}\prod_{i=1}^{N_p}\kappa_{t_i^{(p)}}^{(p)},$$

$$p(G \mid \mu_{G0}, P_{G0}) = \prod_{w=1}^{W}\mathrm{N}(G^{(w)} \mid \mu_{G0}, P_{G0}),$$

$$p(B \mid \mu_{B0}, P_{B0}) = \prod_{p=1}^{P}\mathrm{N}(B^{(p)} \mid \mu_{B0}, P_{B0}),$$

$$p(M \mid \mu_0, P_{M0}) = \prod_{w=1}^{W}\mathrm{N}(M^{(w)} \mid \mu_{M0}, P_{M0}),$$

$$p(S \mid l_0, \theta_0) = \prod_{w=1}^{W}\mathrm{Ga}(S^{(w)} \mid l_0, \theta_0),$$

$$p(D_T) = \prod_{w=1}^{W}\prod_{p=1}^{P}\mathrm{Beta}(D_T^{(w,p)} \mid \alpha_{T0}, \beta_{T0})$$

$$p(D_A) = \prod_{w=1}^{W}\prod_{p=1}^{P}\mathrm{Beta}(D_A^{(w,p)} \mid \alpha_{A0}, \beta_{A0})$$

FIG. 12

$$\beta_*^{(wp)} \sim N(G^{(w)} * B^{(p)} + M^{(w)}, S^{(w)})$$
$$\beta^{(wp)} = \sigma(\beta_*^{(wp)})$$
FIG. 14
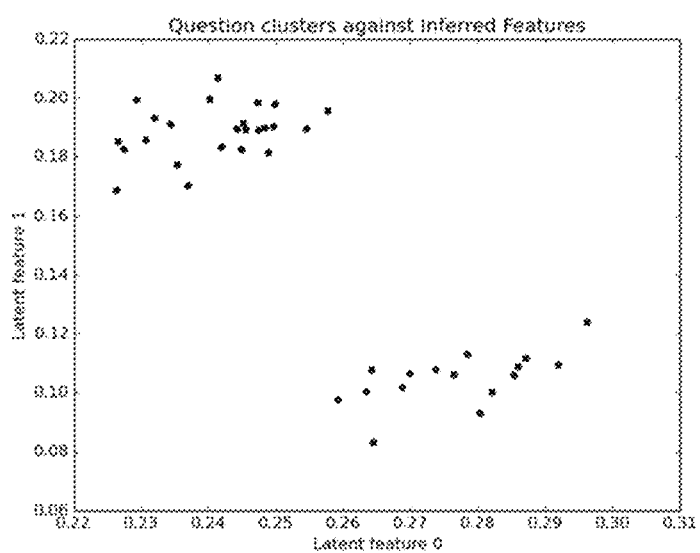
FIG. 15
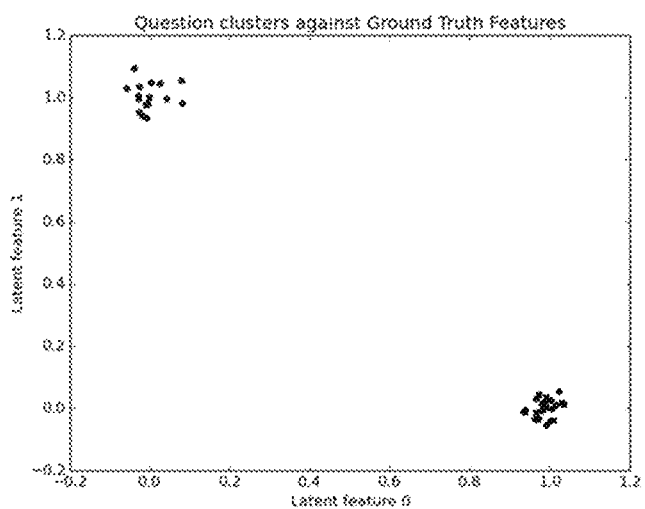
FIG. 16

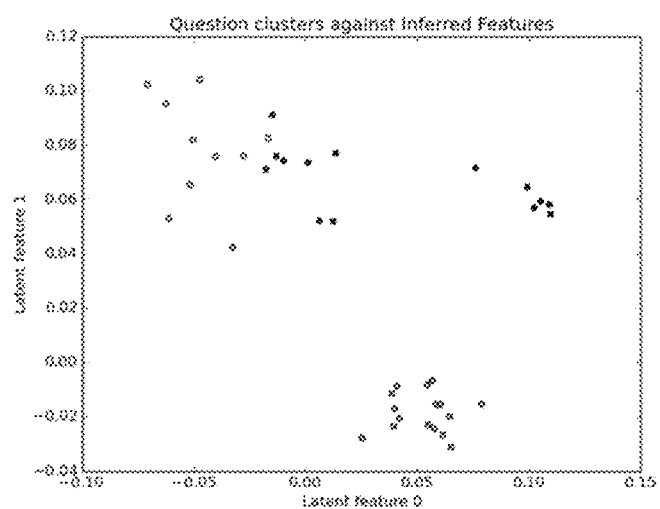
FIG. 17
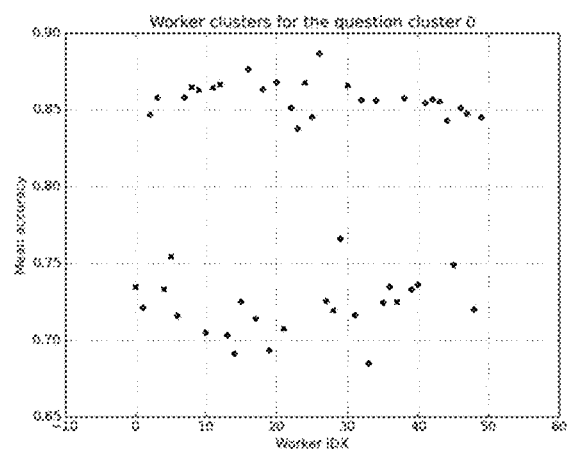 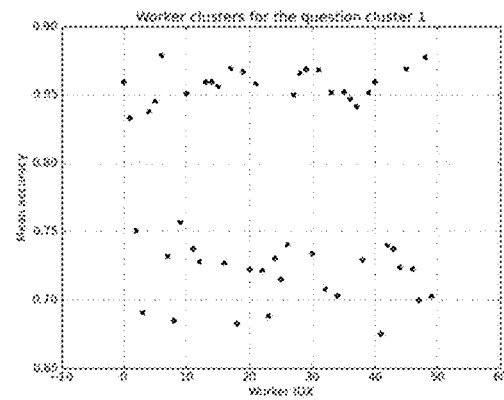
FIG. 18A　　　　　　　　　　　　　FIG. 18B

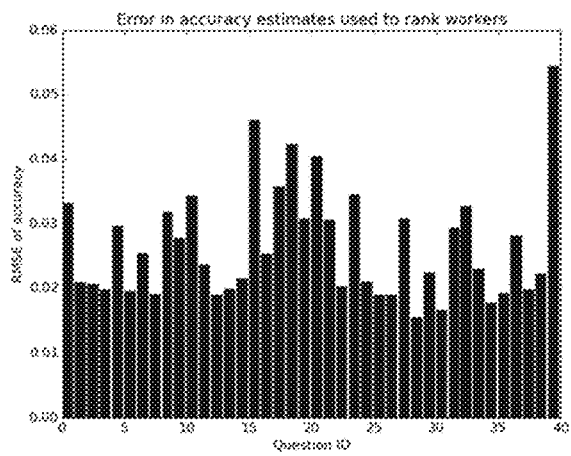
FIG. 20A
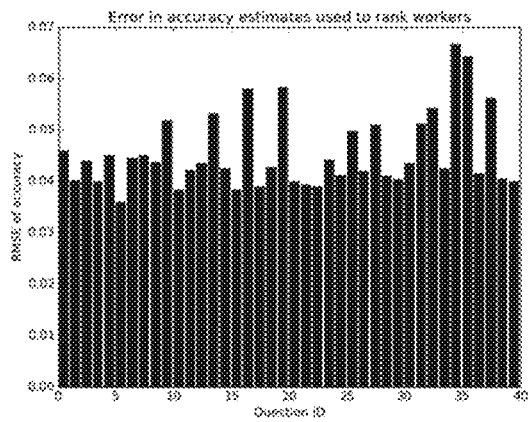
FIG. 20B
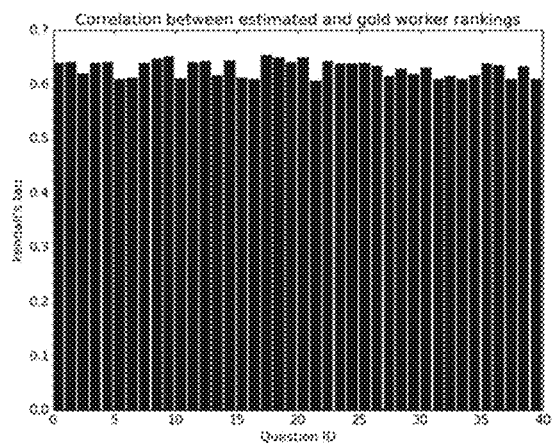
FIG. 20C
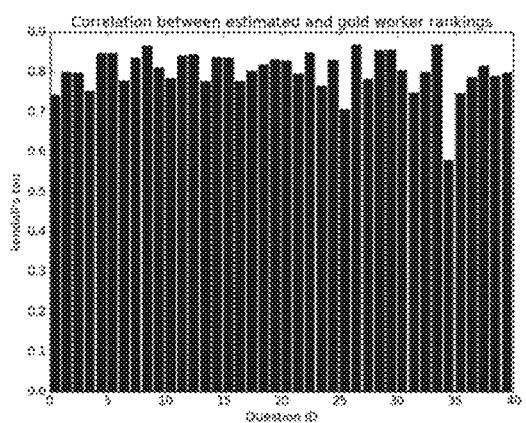
FIG. 20D
$$\tau = \frac{\text{(number of concordant pairs)} - \text{(number of discordant pairs)}}{\frac{1}{2}n(n-1)}$$
FIG. 21

FIG. 23

| ID | TITLE | KEYWORDS | TYPE | REWARD | # OF ASSIGNMENTS | SCHEDULE | WORKER SPECS | WORKER QUALITY | RULES | ... |
|---|---|---|---|---|---|---|---|---|---|---|
| TASK_1 | TITLE_A | TAG, BLOG | CATEGORIZATION | $0.02 | $0.02 | N/A | N/A | HIGH | RULE_1 | ... |
| TASK_2 | TITLE_B | ANALYZE CODE | VALIDATE | $0.05 | $0.05 | 1 WEEK | SOFTWARE | N/A | N/A | ... |
| ... | ... | ... | ... | ... | ... | ... | ... | ... | ... | ... |

US 11,983,645 B2

AGENT APTITUDE PREDICTION

PRIORITY CLAIM

This application is a continuation under 35 U.S.C. § 120 of U.S. patent application Ser. No. 15/588,530, filed 5 May 2017, now U.S. Pat. No. 11,080,608, which claims the benefit under 35 U.S.C. § 119(e) of U.S. Provisional Patent Application Ser. No. 62/332,827, filed 6 May 2016, entitled "AGENT APTITUDE PREDICTION", which are hereby incorporated by reference for all purposes.

BACKGROUND

Field of the Disclosure

This disclosure relates generally to engine aptitude prediction and more particularly to aggregation of independently weak classifiers to predict engine aptitude.

Description of the Related Art

In the past, differences in the propensity of certain engines to perform certain tasks better than others have not been easily identifiable. For instance, some shopping sites consistently find men's jackets with a higher reviewer rating and lower price than another site, while the other site consistently finds men's pants with other more desirable attributes. These differences in the propensity of certain engines to perform certain tasks more efficiently is referred to generally herein as an engine's "aptitude". Engine aptitudes can vary significantly between applications and between tasks, and various applications have sought to take advantage of these differences in engine aptitudes by blindly or unintelligently assigning or distributing units of work to certain engines.

SUMMARY

In one or more embodiments, machine learning methods may combine multiple "weak" independent classifiers into a single, more accurate, predictor. Often, these methods are referred to as Weak Classifier Aggregation (WCA) methods. For example, the Independent Bayesian Classifier Combination (IBCC) method is a WCA method that combines the predictions of independent classifiers, or multiple "weak" learners, for a given event into a single prediction. Those of ordinary skill in the art will appreciate that particular implementations of WCA methods referenced herein are merely cited as non-limiting examples and are not limited to the particular implementations disclosed. For example, one non-limiting implementation of WCA for answer, result, or output confidence estimation (ACE) uses IBCC. Another non-limiting implementation of WCA includes Transfer-Learning IBCC (TLIBCC) as described in more detail below. Nevertheless, the teachings of the present disclosure are not limited to any specific implementation of WCA. In particular embodiments, any method that combines weak predictors, classifiers, or methods to produce stronger methods may be utilized.

In one or more embodiments, one or more methods, processes, and/or systems may receive data associated with effective completion of tasks by agents and determine a positive correlation within the data between first particular feature values of feature vectors associated with the tasks and second particular feature values of feature vectors associated with the agents. A first agent associated with a feature vector that matches, within a first threshold, the second particular feature values may be selected, and a probability that the first agent will effectively complete a first task based on a feature vector associated with the first task matching, within a second threshold, the first particular feature values may be determined. In one or more embodiments, determining the positive correlation may include assessing a level of effectiveness with which each of the tasks was completed; selecting a first set of the tasks that was most effectively completed; determining similar feature values among agents that completed each task in the first set; and determining similar feature values among tasks in the first set. In one or more embodiments, determining the probability that the first agent will effectively complete the first task may include deriving a scalar product between the first agent's feature values corresponding to the first particular feature values and the second agent's feature values corresponding to the second particular feature values. In one or more embodiments, a confusion matrix, for the first agent with respect to the first task, that assesses the probability that the first agent will effectively complete the first task based on historical completion of other tasks may be determined. For example, the other tasks are associated with feature vectors that match, within the second threshold, the first particular feature values.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 1A-8, 11A-11C, 12, and 21 illustrate various equations referenced for discussing, deriving, and proving Transfer Learning Independent Bayesian Classifier Combination methods and applications, according to one or more embodiments;

FIGS. 9A-10B, and 13-20D provide charts gathered from empirical experiments using Transfer Learning Independent Bayesian Classifier Combination methods on engines and tasks, according to one or more embodiments;

FIG. 23 illustrates example features in a worker management system, according to one or more embodiment.

DESCRIPTION OF EXAMPLE EMBODIMENTS

Figure 9A:
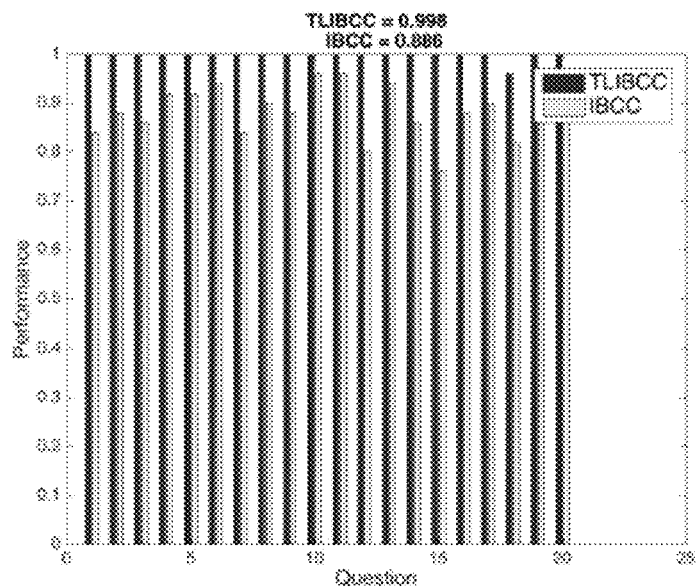

Processes, engines, and other entities capable of performing work (herein collectively referred to as "engines") are often better suited or optimized for one or more particular purposes. For example, a dedicated graphics processing unit (GPU) may be optimized to handle tasks associated with hardware intensive gaming or video applications, or at least may perform such tasks more efficiently than a general purpose computer processing unit (CPU) since they are reserved for such functions. As another example, a particular search engine is optimized to retrieve recently posted financial, business, and other time sensitive news stories, while another search engine is better suited for retrieving more historically relevant content. As yet another example, a particular shopping site sells trendy, designer, or modern items, while another shopping site lists more economic alternatives. As still another example, certain engines are more efficient or better at performing pattern recognition and other memory oriented tasks, while other engines are better suited for more creative work.

In one or more examples, differences in the propensity of certain engines to perform certain tasks better than others may not be easily identifiable. For instance, some shopping sites consistently find men's jackets with a higher reviewer rating and lower price than another site, while the other site consistently finds men's pants with other more desirable attributes. These differences in the propensity of certain engines to perform certain tasks more efficiently is referred to generally herein as an engine's "aptitude". Engine aptitudes can vary significantly between applications and between tasks.

Various applications often seek to take advantage of these differences in engine aptitudes by blindly or unintelligently assigning or distributing units of work (referred to generally herein as "tasks") to certain engines. For example, an operating system scheduler analyzes queued instructions and identifies certain instructions as being associated with graphics processing or gaming-related tasks. The scheduler assigns those tasks to the GPU for processing. As another example, certain users experience better results when looking for business or financial information for a particular company, and blindly go to that search engine when the users looking for that type of information. With regards to the shopping example, users may search for items on websites based on advertisements or because they offer free shipping (regardless of whether the total price is larger than the total price on another site where shipping is not free).

At a high level, certain embodiments of the present disclosure model execution and completion of tasks completed by different engines using machine learning methods to classify tasks and determine which engines are best suited for completing each class of tasks. In certain embodiments, attributes or characteristics of engines and tasks are extracted and stored as features in a feature set or vector. Results from execution of successfully or optimally completed tasks are analyzed to determine common features. A combination of one or more of those common features associated with a task may signal that a particular engine is best suited for completing the task. Alone, these features may represent a weak classifier. However, once identified, these weak classifiers can be combined to produce a strong classifier for use in clustering work for execution by one or more optimal engines. The engines, as described above, may include processors, search engines, engines running on shopping sites, or any other entity capable of performing work.

For example, a user wishes to find a pair of designer men's shoes for an upcoming event. Several shopping site aggregation services specialize in aggregating product listings to present to a user for comparison shopping. In certain embodiments, the aggregation services use an underlying engine to compile the list of products to return to the user. In this example, the user's request is considered a unit of work to be potentially processed by the aggregation services. The engines in this example refer to the underlying processing capability of each service.

In certain embodiments, features of the request (task) are extracted. For example, the user may manually input a shopping request indicating that he/she prioritizes certain aspects of a product, such as lowest price, size, and popular designer brand. Other aspects of a product listing may be extracted as features, such as user review, featured or recommended status, number of users who purchased the product, special manufacturing processes (e.g., made of recycled materials), free shipping, price, and the link. The extracted features may include virtually any combination of any attributes of item listings. As yet another example, extracted features may include whether the user purchased, returned, or "liked", a product retrieved by the engine, or whether and how highly the user or other users rated retrieved products. The features may further include an analysis of how quickly the listing site returned results, overall user satisfaction with product, and any other measurable or extractable attribute of the product or user satisfaction. Such an embodiment is specifically implemented using the methods described below.

A machine learning method, such as a Transfer Learning Independent Bayesian Classifier Combination (TLIBCC) method discussed below, is applied to model the prior task executions. Features of engine execution for successfully fulfilled requests are clustered to determine particular features of tasks that each engine is especially adept at completing. By way of explanation, a task may be deemed "successfully completed" if the user purchases the retrieved item and does not return it. Over the course of several iterations, each service has processed numerous requests or tasks. Features regarding each service's execution of those tasks are stored. Attributes of tasks that each engine has successfully completed are analyzed to identify common features. For example, one engine may be adept at finding designer clothing that is highly rated and has the lowest price. This information can be used to direct future requests having similar feature profiles to those engines that are the best at executing those shopping requests.

As another example application of this process, an organization, such as a travel, transportation, or accommodation booking agency, provides a customer-facing web site that has a messaging interface allowing users to quickly contact the organization with questions or concerns. The messaging interface provides a "chat now" option that allows customers to submit queries to the organization. In traditional customer service applications, a dedicated customer service agent may be required to field user questions. For example, a machine or human agent is assigned one or more chat sessions to answer customer questions without regard to the customer's question, order history, personal information, or the like. In certain other customer service architectures, responses are selected from a fixed menu of reply messages after parsing the message using a natural language parser to identify themes and context. For example, the "chat bot" or customer service agent may identify that a user is inquiring about a recent hotel reservation, and can retrieve information regarding the reservation for the user, while providing additional information or links to allow the user to confirm, cancel, or modify that reservation.

In certain implementations, a machine learning method may be implemented in order to optimize or improve the function of the customer service chat services provided by one or more organizations. Continuing on with this example, the booking agency may utilize a TLIBCC method to aggregate various indicators of customer service agent, chat bot, or crowd-sourced agent aptitude with respect to answering certain categories of questions. For example, questions may be categorized with respect to business unit, such as (1) hotel accommodations, (2) travel booking, or (2) entertainment booking. As another example, questions may be categorized with respect to questions regarding prospective or existing bookings, complaints, or in-stay accommodations. Agent or engine aptitude can be assessed based on evaluations of answers provided to each type or category of question. For example, speed, helpfulness, friendliness, customer appreciation, and ability to resolve issues can be assessed for each agent for each type of question. As another example, information regarding an agent's ability to upsell or provide additional services to a customer is tracked. This information is generally stored in as features in a feature vector. These factors are assessed for each agent, chat bot, crowd-sourced worker, or any other type of processor or worker that provides answers to customer questions. A machine learning model is created using the feature vectors and engine or agent aptitude is predicted using the TLIBCC method to aggregate multiple independently weak classifiers into a strong classifier or predictor of agent or engine aptitude. The results of such analysis can be used to interpret questions and assign particular classes of identified questions to those agents that are best suited to those questions based on any identifiable correlations in the model.

As yet another example, the TLIBCC method may be used to assess the aptitude of a group of workers that provide training data in order to find those workers that provide the best data for each type of task. In one instance, an organization may process a vast number of different form images, such as PDF (Portable Document Format) forms that have been filled out. In another instance, corporate disclosure statements or SEC (Securities and Exchange Commission) 10K and 10Q annual or quarterly filings may include forms that may include valuable information regarding a company's financials. A type or category of form may be identified. For example, forms may be sorted into financial forms, tax forms, insider trade announcements, and/or omnibus forms, among others, that may include information from all these categories. Workers are assigned to identify "fields" within the forms. For example, the forms may be in a template form, or may contain boilerplate language for the majority of the form. Certain key areas of the form may contain information that the organization wishes to extract, such as numbers (i.e., gross revenue, costs, profit, forward earnings) or statements, such as Management's Discussion and Analysis, and the like). Any of these areas of the form may be designated as "fields." Information from these fields can be extracted and used for various in-house or third party applications. In certain embodiments, agent aptitude can be assessed with respect to ability to correctly identify fields in these forms. Information regarding agent aptitude is stored in a feature vector that is associated with the agent, and the feature vectors may be utilized in generating a machine learning model. While the output of the agent responses is also input into a machine learning model as training data to train machines to perform agent tasks, the present model will be used to assess agent aptitude with respect to each type of question. In certain embodiments, the TLIBCC method is used to aggregate weak classifiers of agent aptitude into a strong predictor. For example, particular features can be identified as distinguishing a particular worker's aptitude for field identification with respect to SEC filings. This worker may have increased familiarity with these forms due to previous employment or experience. Thus, training data output from this particular worker may be more valuable than training data output from other works. The predictors output from such an analysis can be used to assign field identification tasks to those workers who provide the strongest training data for that type of task.

As yet another example, any combination of human and/or machine workers can be used to extract data or answer queries about any incoming flow of electronic media. Extending the above example, the configuration described above can be used to identify workers, agents, crowd-sourced workers, or any other entity that is capable of performing work that are best suited for completing any classification of task. For example, image processing tasks can be directed to one or more optimal workers. The analysis again uses the TLIBCC method to identify multiple weak classifiers and predict the aptitude of each worker based on features associated with those classifiers. Accordingly, this turns multiple weak classifiers into a single strong predictor of worker performance.

Certain machine learning methods combine multiple "weak" independent classifiers into a single, more accurate, predictor. Often, these methods are referred to as Weak Classifier Aggregation ("WCA") methods. For example, an Independent Bayesian Classifier Combination ("IBCC") method may include a WCA method that combines the predictions of independent classifiers, or multiple 'weak' learners, for a given event into a single prediction. In certain embodiments, the IBCC method is a "supervised" method, which refers to the fact that it often uses labeled or verified training data. The IBCC method is often used in the context of post-result answer, result, or output confidence estimation ("ACE"). For example, a series of tasks are provided to a user. As the user completes each task, information regarding the user's answering process, environment, outputs, submission method, and the like are collected and stored in a feature vector. For example, the time it takes the user to answer each task is stored along with the output. An ACE process, such as an ACE process implementing a WCA method like IBCC evaluates the relative reliability of each received output. The IBCC method uses multiple independent weak learners, or training data, to determine or "learn" events that each independent weak learner or some combination of weak learners makes accurate predictions for. For example, the IBCC method infers strong "learners" from multiple weak learners using a Bayesian averaging approach that combines the outputs of multiple weak models over the test data to produce better predictions than are otherwise achievable by a single weak model. As an example in an environment for assigning tasks to engines for completion, the IBCC method may "learn" from a set of training data that tasks of some particular type usually take longer than ten seconds to output correctly when the user is using a desktop environment, and that outputs submitted in less than five seconds are usually candidates for error or fraudulent outputs. Engine outputs can be flagged for review, executed by other engines (e.g., "extended" for additional execution by other engines, which is also referred to herein as "extend+1"), or reviewed by other specialized engines trained to verify incorrect, inaccurate, or fraudulent work execution. In certain embodiments, WCA methods such as IBCC may also be used to combine multiple engine outputs for the same or a similar work task into a single output. Engine responses can even include outputs from trained models or trained methods (which are sometimes referred to as "Silver Engines") that provide automated task outputs. Thus, certain WCA methods contemplate combining engine responses with automated engine responses to output verified or high-confidence outputs.

Note that particular implementations of Weak Classifier Aggregation ("WCA") methods referenced herein are merely cited as non-limiting examples and are not limited to the particular implementations disclosed. For example, one non-limiting implementation of WCA for ACE uses IBCC. One extension of a WCA method includes TLIBCC as described in more detail below. However, the teachings of the present disclosure are not limited to any specific implementation of WCA. Instead, any such method that combines weak predictors, classifiers, or methods to produce stronger methods may be used. Any references to TLIBCC herein may be implemented using any Weak Classifier Aggregation method, such as, for example, TLIBCC.

Similarly, the teachings of the present disclosure are not limited to any particular context or application. The embodiments and descriptions herein may apply the discussed methods in the context of search engine selection applications, shopping site selection applications, or engine task assignment applications in a crowd-sourced engine management environment. However, these methods are equally applicable to a variety of scenarios. For example, these methods may be particularly useful in any application that can benefit from using machine learning to aggregate numerous weak classifiers into strong classifiers for assignments.

In certain embodiments, an engine aptitude prediction method ("EAP") such as the TLIBCC method is used to predict aptitude or the propensity to output particular questions correctly. As used herein, a "question" may be used interchangeably with a "unit of work," and generally represents any task that requires engine processing for completion. EAP methods such as the TLIBCC method extend WCA methods such as IBCC to make predictions about which engines are suited to outputting different types of questions. While IBCC methods, for example, serve to predict the posterior confidence of an engine's output, TLIBCC methods determine a probability of an engine outputting a specific type of question correctly before it is outputted by that engine. These methods can use shared features between engines and questions, including both latent and explicitly linked features, to map complementary features between vectors and determine engine aptitude for each particular question type. In certain embodiments, the feature vector for a question in such a model includes skills used to output the question accurately while the feature vector for the engine includes the set of skills the engine has demonstrated. During an inference process, the TLIBCC method learns the right values for the feature vector for each engine for each question. In certain embodiments, engine skill feature vectors are matched to the question requirement skills during a testing phase. EAP methods, such as TLIBCC methods, introduce extra levels in the hierarchical IBCC to model engine skill levels, facilitate transfer learning between questions to increase the performance of the IBCC method. In certain embodiments, engine performance on questions they have not yet answered is predicted.

In certain embodiments, an engine management module associates each question with a set of skill requirements. For instance, skill requirements may include skills, special functions, optimizations, and/or capabilities, among others, that may be required and/or useful for an engine to complete a task in a desired manner. The desired manner may refer to a variety of metrics that have been prioritized by the work distributor. For example, some users may desire that an engine return the fastest, most accurate, or correct output.

An engine processing two similar tasks that have similar skill requirements will have a similar level of aptitude in completing each task. In other words, knowledge of an engine's aptitude is "transferred" between the tasks with similar skill requirements. Both question skill requirements and engine skill levels are represented by latent feature-vectors. The TLIBCC method learns these feature-vectors from a set of engine responses across a set of questions. The accuracy of an engine (e.g., the relative level of reliability of an engine correctly answering a question) can be generalized as the scalar product between the engine's feature-vector and the question feature-vector. For example, a very positive scalar product may indicate strong reliability, and a very negative product may indicate low reliability. The engine's average accuracy across all the questions is also incorporated in the engine model. Thus, if an engine has exhibited competence on all questions he/she/it has seen to date, then this is strong evidence to believe he/she/it will be competent answering further questions, for instance.

For example, an engine management module receives a set of tasks that are each associated with a feature vector that describes properties of the task. As an example, the feature vector may include an "overall difficulty" feature that assesses the overall difficulty of the task, a "technical knowledge" feature that describes whether the question requires an engine having a technical background to complete the task, and a "special skill" feature that describes some skill required to complete the task. The engine management module seeds the task feature vectors with randomized values to initialize the data set. In certain embodiments, feature vector values may be manually entered and assessed and verified by an administrator.

The engine management module also assesses engine skill levels using feature vectors associated with each engine. Engine skill levels may be assessed based on each engine's prior aptitude in accomplishing or outputting difficult or complex tasks, or tasks that have been identified with some other criteria. For example, a task that requires a technical background may not be assessed as difficult, but may require an engine that has basic understanding of a technical nature. The engine skill levels can be assessed at any level of detail required to distinguish one or more engines as advanced or deficient in some set of skills. In certain embodiments, engine skill level feature vectors are initialized with random seed values which are replaced by more accurate values as the engine completes more tasks. For example, a machine learning method may learn accurate values for each engine skill level feature vector from task completion data. As the engine completes more tasks, the engine's skill level can be assessed by the method. Similarly, task feature vectors are learned from engine responses.

In certain embodiments, the engine management module may determine if the engine is likely to accomplish a particular task based on the task skill requirements and engine skill level feature vectors. For example, the engine management module may derive a scalar product between the two vectors to determine the likelihood that the engine will accomplish the task correctly. This information can be used to assign engines tasks that they are presumably better suited for accomplishing.

In certain embodiments, an accuracy model is used to generate prior pseudo-counts of the engine's confusion matrix. This model is modifiable. For example, mean engine accuracy can be removed or switched off if inappropriate or we can replace the scalar product between the engine and question feature-vectors by a distance metric or introduce dynamic engine skill level feature-vectors to model diurnal engine accuracy variation.

In certain embodiments, tasks are administered to engines that are each associated with a diverse set of skills. For example, some of the engine skills may be modeled by a machine learning method based on evaluations of prior engine responses. For example, the engine may previously have completed several tasks correctly that require a particular set of skills. The machine learning method may associated the engine with those particular skills. Thus, based on the engine responses, new tasks can be evaluated as to whether they require that set of skills. For example, if an engine with skill A outputs a question correctly and an engine will skill B outputs the question incorrectly, skill A may be inferred as being required to output the question. This simplified example can be extended to evaluate a large number of skills for a task from a large number of diverse engine responses. In this context, "diverse" may refer to each engine's skill set. In certain embodiments, engines are associated with skill based on their responses to tasks with known skill requirements. For example, certain tasks may be known to require skill A. An engine that correctly outputs this task may be newly associated with skill A based on his/her response.

In certain embodiments, a set of attributes associated with correctly completing a task is received based on attributes required for completing one or more similar questions. An accuracy model, as described below, is determined for the particular engine. In certain embodiments, a skill feature vector is determined for the engine that sets forth a set of skills that the engine is associated with. A general engine accuracy can be derived for a particular task can be derived by taking the scalar product of the skill feature vectors associated with the engine and the question. In certain embodiments, and as described in more detail below, a confusion matrix can be derived from the accuracy model and the question skill feature vector. The confusion matrix for an engine/question combination can be used to determine a probability of the engine completing the question correctly. This information can be used to, for example, determine particular clusters of questions to assign to the engine to maximize his/her skill set.

Throughout this discussion a "customer" refers to an entity that submits/creates a task to a workforce management server to be sourced (e.g., published, broadcasted, advertised, etc.) to a set of one or more engines. This set of one or more engines may be referred to as a "crowd". Engines may be included of a cohesive or disparate group of individuals. A "task" (also referred to as a "problem") may include one or more actions to be performed by the engines. The result of the engines performing these requested actions may be referred to as the "output" or "result" of the task, the "work product" of an engine", or the "solution" to the problem. A "project" may refer to multiple related tasks.

The description below describes the TLIBCC and the relationship between the confusion matrix and the engine accuracy and provides the variational Bayesian inference approach for the TLIBCC. Further below, the evidence lower bound which is required to both determine when the VB method has converged and also determine the optimal size of the skill level feature-vectors is discussed. The TLIBCC is also evaluated on synthetic and real-world data. Yet another section describes how time taken to output a question and other task and engine features can be incorporated into the TLIBCC. The result is the TLIBCC feats method which is then evaluated. In summary, the TLIBCC performance is significantly better than the IBCC on both simulated and real-world data (yielding a performance improvement of as much as 10%.

TLIBCC: Transfer Learning Independent Bayesian Classifier Combination

As per the IBCC model, the confusion matrix, $\pi$, is the probability of an engine responding with a class label given the question instance. However, there is now one confusion matrix for each engine and for each question. Thus, we introduce a question index, p:

$\pi^{(kp)}$: Confusion matrix for engine k when completing question p.

The engine "accuracy", $\beta^{(wp)} \in [0, 1]$ may be a probability of correctly completing a question and may be roughly a mean of the diagonal elements of the confusion matrix. The engine inaccuracy, the probability that he/she/it outputs the question incorrectly, is simply: $1-\beta^{(wp)}$.

Of course, an engine may not be equally reliable at completing a question for different items and this variation in engine reliability is modeled by the spread, $m^{(wp)} \geq 0$. When m is small there may be significant differences in an engine's reliability between each item.

The confusion matrices are generated from a Dirichlet distribution with hyperparameters a corresponding to $m^{(wp)}\beta^{(wp)}$ and $m^{(wp)}(1-\beta^{(wp)})/(J-1)$, and as shown in FIG. 1A.

Importantly, we note that the a priori mean response probability depends on, and not on m. Since the pseudo counts are positive we assume that m are Gamma distributed. Furthermore, as $\beta$ is a probability it is Dirichlet distributed.

Each engine has a competence $M^{(w)}$ independent of the question asked of her. However, each engine has varying abilities at completing different questions. Consequently, they also have a skill set defined by the F-vector $G^{(w)}$ and each question requires an engine skill set defined by the F-vector $B^{(p)}$ in order to output that question correctly. The engine accuracy, $\beta^{(wp)}$ is generated from the skill match between the engine and the question and the overall engine competence is illustrated in FIG. 1B, where G*B denotes the scalar product between G and B, S is the precision and a is the logistic function. We assume that B, G and M are all Gaussian distributed.

The table in FIG. 1C details the constants used in the TLIBCC model.

The joint posterior over the TLIBCC model components is illustrated with reference to FIG. 2.

Variational Bayes Inference

The posterior approximation may be assumed to factor as shown in FIG. 3A. Since the posterior approximation is a linear sum over log m and m the expected log Beta function, with respect to $\beta$, may be conjugate with the Gamma distribution. Note that the coefficients, $U_b$, $V_b$ and $W_b$, are determined for a discrete set of values for $\beta$ between 0 and 1 and for each J. These coefficients are calculated using least squares regression over these $\beta$ samples and over a range of m values so that the equation in FIG. 3B and FIG. 4 holds true. For instance, the equation in FIG. 3B and FIG. 4 may hold true for all $\beta$ with the calculated coefficients.

For all $\beta$, the statistics E[log m] and E[m] are determined numerically from q(m) and Ub,Jp ($\beta$) etc. are obtained through lookup or interpolation for reasons of computational efficiency. A Beta distribution, q($\beta$(wp)) may be determined by taking the exponent of log q($\beta$) at the sample points between 0 and 1 and then normalizing. E[$\beta$(wp)], E[log $\beta$(wp)] and E[log(1-$\beta$(wp))] may be evaluated numerically for use in the variational update equations and to calculate the variational lower bound. Next, the derivation follows to FIGS. 5-7.

We note that the spread, $m^{(wp)}$, is learned only using the set of outputs for engine w on question p. If this set, of size $J_p$, is small then the spread is uncertain and will depend heavily on the hyperparameters $E_0$ and $\eta_0$. As a result, the TLIBCC can be fragile and yield very noisy classifications. However, if we assume that the engine's accuracy spread is independent of the question then the number of samples used to train $m^{(w)}$ is $\Sigma_p J_p$ and the classifications are less noisy. As well as replacing $m^{(wp)}$ with $m^{(w)}$ in the variational Bayes equations above, (7) and (8) become as shown in FIG. 7.

The Variational Lower Bound

Figure 8:
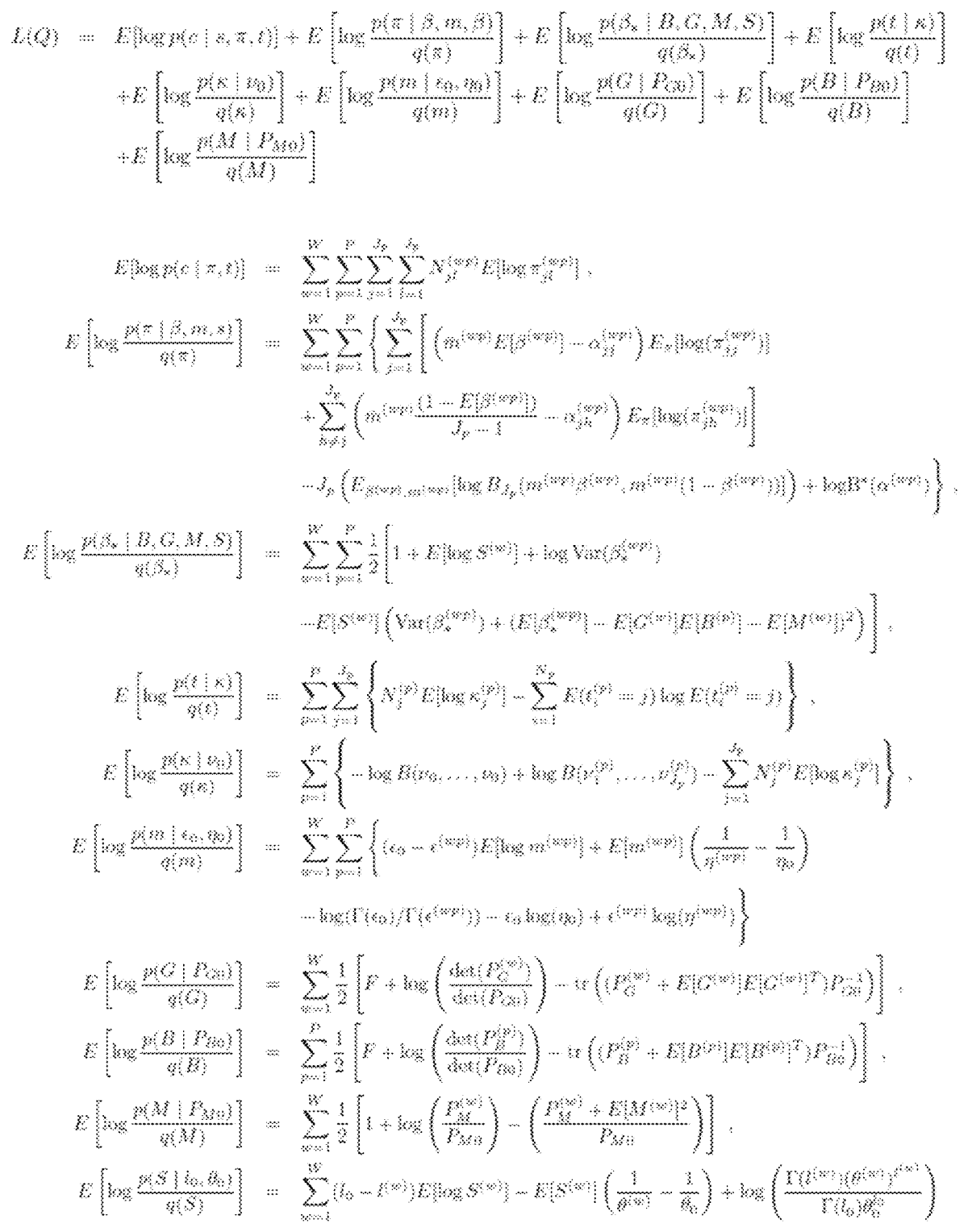

The score function which we need to maximize is the lower bound of the log marginal likelihood as shown in FIG. 8, where F is the number of features associated with each engine skill level and requirements of each question and, $$E[S^{(w)}] = t^{(w)}\theta^{(w)},$$

$$E[\log S^{(w)}] = \psi(t^{(w)}) + \log \theta^{(W)}.$$

Further, the beta function over the matrix, log B*, is expressed as the familiar beta function over vectors thus, log $B^*(\alpha) = \Sigma_j \log B(\alpha_j)$, where $\alpha_j$ is the $j^{th}$ row of a.

Evaluation of the TLIBCC on Real-World Data

With reference to FIG. 9A, a comparison of TLIBCC and IBCC performance on 20 simulated questions is illustrated. We begin by demonstrating the efficacy of the TLIBCC on simulated data. We use 7 engines to each label 50 instances each of 20 questions. Each question instance has 10 possible outputs. We divide the engines into two clusters of skills and the questions into two clusters of skill requirements. Only one cluster of engines is able to reliably output questions from a question cluster. FIG. 9A compares the performance (e.g., fraction of questions correctly outputted by each Bayesian classifier combination method). The TLIBCC has greatest mean performance over all questions (e.g., 99.8%) compared to the IBCC (88.6%).

Figure 9B:
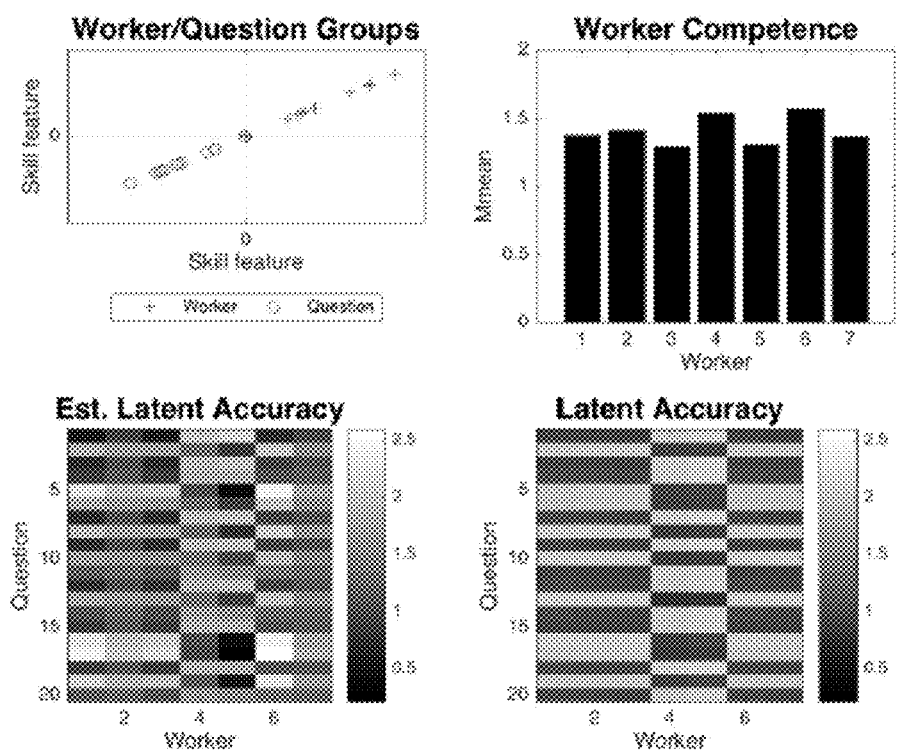

In general, we will not know the intrinsic dimensionality of the TLIBCC skill vectors for arbitrary data. Provided that more dimensions are chosen than necessary the Bayesian inference model will select the appropriate number of components. This is demonstrated in FIG. 9B in which the TLIBCC uses a two-dimensional latent feature vector to model data drawn from an intrinsic single dimension skill vector. The top left pane shows the grouping of the skill vectors inferred by TLIBCC and the redundancy in the two features is captured by their correlation in the plot. The individual questions cluster appropriately each side of the origin as indicated by their ground truth cluster markings (e.g., 'o' and '+'). The engine clusters (indicated by black 'o' and '+') are separated although this is not clear from the plot 1. The top-right pane shows the expected engine competence (e.g., E[M]) for each engine. Finally, the bottom panes show that the TLIBCC can recover the accuracy (e.g., E[G]*E [B]+E[M]) of each engine on each question from the data. TLIBCC two-dimensional latent skill vectors. The top left pane of FIG. 9B shows the grouping of the skill vectors inferred by TLIBCC. The top-right pane shows the expected engine competence (e.g., E[M]) for each engine. Finally, the bottom panes favorably compare the TLIBCC estimated accuracy (e.g., E[G]*E[B]+E[M]) against the ground truth latent accuracy.

Figure 10A:
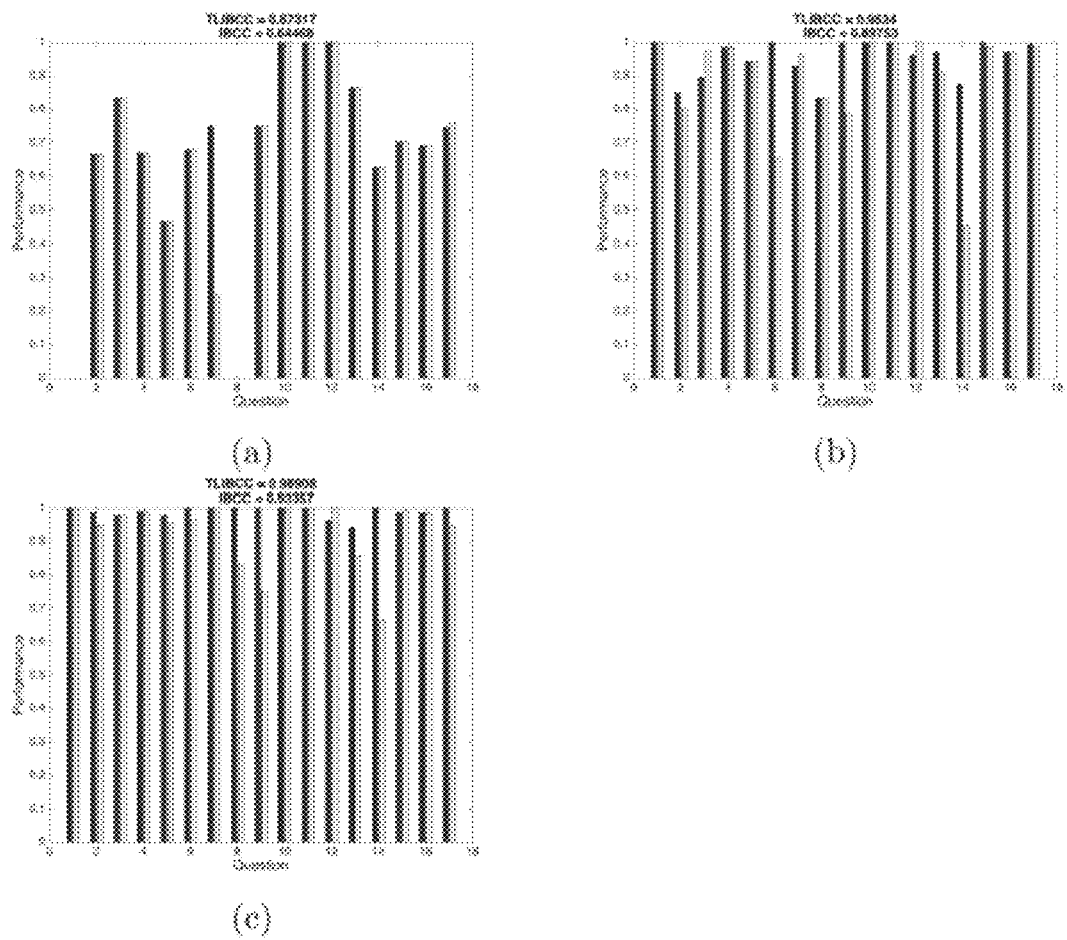

FIG. 10A illustrates a comparison of TLIBCC and IBCC on seventeen questions from WF data. Each bar chart shows the performance for the TLIBCC and IBCC over all gold labeled documents using 20% of real-world data engine responses (b) using 60% of real-world data engine responses and (c) using 80% of engine responses in real world data.

We next evaluate the efficacy of the TLIBCC method on a subset of the real-world data. We call this subset real-world data. We select questions, documents and engines according to the following criteria, designed to reduce the data set to a manageable size, 1. Use questions which have at least fifty engines who responded to the question and at least one other question.
2. Use only those engines with more than thirty responses across all questions.
3. Use documents with more than seven responses but actually use no more than 10 responses.

Figure 10B:
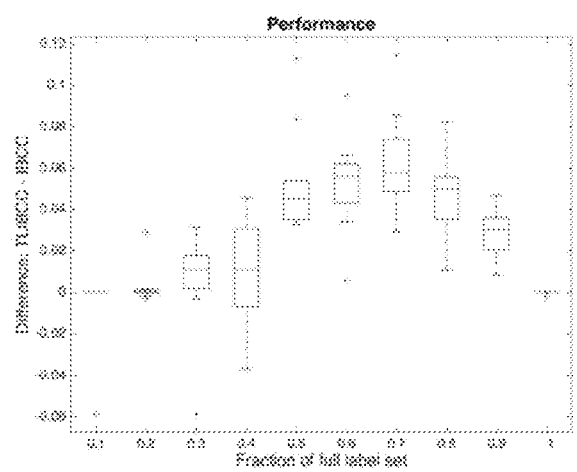

FIG. 10B illustrates a comparison of TLIBCC and IBCC on seventeen questions from WF data. Graph shows the mean performance difference between the TLIBCC and IBCC over all questions for fractions of engine output data in the range 10% total data to 100% total data. Each 'box' in the boxplot is evaluated over ten samples. FIG. 10B evaluates the performance difference between the TLIBCC and IBCC over all questions for subsets of engine output data from 10% of WF data responses to 100% WF data responses. As expected, the TLIBCC and IBCC performances coincide when both the full data set is used (in accordance with our definition of gold labeled data) and when little data is used (as neither method is able to classify the outputs accurately). In between the TLIBCC outperforms the IBCC by as much as 10%.

Incorporating Task Features into the TLIBCC

This section provides a synopsis of how task and engine features, such as time taken to output a question, document length and start position of output in text, can be incorporated into the TLIBCC. It outlines a method for bucketing these features so that the TLIBCC developed above, can be relatively easily extended to incorporate them A confusion matrix for an engine completing question p when his/her/its time taken deviation was in a particular interval T(b) and start position of output in text was in the interval A(b) is illustrated with reference to FIG. 11A. The engine's accuracy B and latent accuracy B* depend on the task/work features and these features are incorporated in equation (4) along with the overall competence of the engine, M, and the engine's skill set match to the question skill requirements G*B.

We now describe how each feature can be incorporated into equation (4).

Completing Rate

If the completing rate deviates from the mean we expect the accuracy of the engine to decrease. If the completing rate deviation is in the interval T then the accuracy β* is reduced by the amount $(D^{(w,p)})^{T_m(b)}$. The "accuracy robustness" metric associated with the completing rate, $D^{(w,p)}$, is a scalar constant that indicates the rate at which the engine's accuracy decreases with the completing rate deviation from the mean. It is inferred from the engines' responses via our variational approach. Note, that the engine's accuracy does not vary significantly between different completing rate deviations when DT is close to unity. However, accuracy varies considerably when DT is close to zero.

Document Length and Position of Output in Document

We expect the accuracy of the engines response to decrease with the start position of the output in the text (due to engine boredom etc.). If the position of the output in the text is in the interval A then the accuracy β can be further reduced by the amount $(D^{(w,p)})^{A_m(b)}$ as shown with reference to FIG. 11B.

Again, the accuracy robustness metric associated with the location of the output, $D^{(w,p)}$, is a scalar constant between 0 and 1 that indicates the rate at which the engine's accuracy decreases with the position of the output in the document. Again, this is inferred from the engines' responses via our variational approach. Furthermore, as per DT, accuracy is significantly affected by different relative locations of the text when DA is close to zero.

We assume that the accuracy spread, m, is not affected by the task accuracy robustness, or task/engine features. However, this assumption can be weakened if required. The joint posterior over the feature augmented TLIBCC model components is shown in FIGS. 11C and 12.

Distributions over the accuracy robustness parameters, DT and DA, are calculated at samples in the range 0 to 1. Their prior distributions are drawn from beta distributions with hyperparameters set to unity to correspond to the uninformative prior.

Evaluation of the TLIBCC with Task Features on Simulated

Unfortunately, currently, the variational Bayes inference method gives very poor results on simulated data. Good TLIBCC feats performance is available only when the model is stripped down to a single task feature by removing the skill vectors B, G and M from the model (and data generation routine) and all other task features and, further, only when the expected value for the engine accuracy is initialized close to 1 in the variational Bayes method. Unfortunately, this initialization strategy does not correct the poor performance in the full model when the skill vectors and all task features are present. Before we expend more time on 'debugging' the variational Bayes code in this case, it might be a good idea to verify that the model, and especially the general task feature form, as per (10), is intuitively right for real-world applications.

Figure 13:
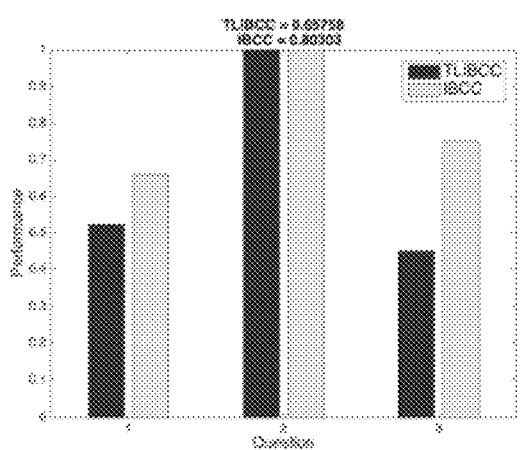
Figure 19A:
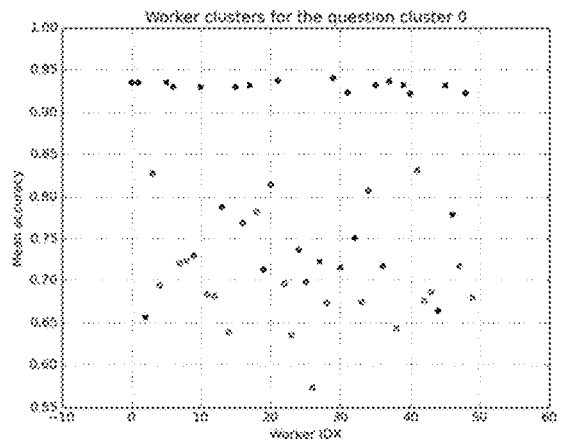
Figure 19B:
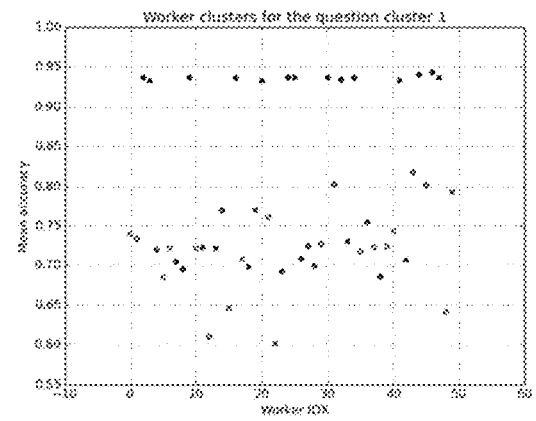
Figure 19C:
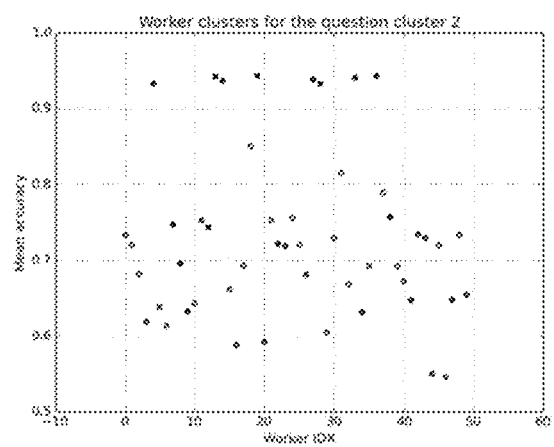
Figure 19D:
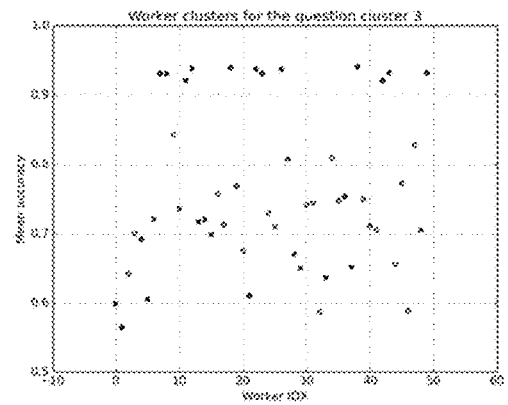

With reference to FIG. 13, a comparison of TLIBCC feats and IBCC on 3 questions from a simulated data set. This example is typical of the current superior performance of the IBCC when task features are modelled by the TLIBCC.

Grouping and Ranking Engines

The EAP methods described above can be used as inputs to cluster tasks and group and rank engines for completing tasks.

Clustering Questions

We begin by clustering the questions so that questions where the same engines have similar levels of accuracy are placed in the same group. The question clusters identify different types of task with different skill requirements. Clustering can be performed using a Bayesian method that learns the number of clusters required from the data as described above. For example, in the TLIBCC model (described above), the engines' accuracy on different questions is modeled using a latent function, which is mapped through a sigmoid function to a probability. The latent function has the form shown in FIG. 14, where $\beta^*(wp)$ is the latent function value for engine w on question p, $\beta(wp)$ is the accuracy for engine w on question p, $\sigma( )$ is the sigmoid function, N is a normal or Gaussian distribution, S(w) is the variance, and the mean is defined using the terms G(w), the engine's skill vector, B(p), the question skill requirements, and M(w), the engine's overall competence.

We group questions according to their skill requirements, B(p), which form rows of a matrix, B, that may include all skill requirements for all questions. Each skill requirements vector is, in effect, a set of features describing the question that can be supplied to one of several methods for clustering, outlined below.

Methods for Clustering

Since the B matrix contains real-valued, unbounded elements, a natural choice of clustering model is the Gaussian mixture model (GMM). In this model, we assume that each data point (e.g., question skill requirements vector) is drawn from one of several multivariate Gaussian distributions. Each of these Gaussian distributions corresponds to a particular mixture component. Therefore, the membership of a cluster corresponds to directly to being drawn from a particular mixture component. To infer the posterior distribution over cluster membership, we have to determine the likelihood that a particular data point was drawn from the Gaussian distribution belonging to each mixture component. The GMM method has many implementations, such as the GMM method available in Python SKlearn, which uses EM to find a maximum likelihood solution. This does not use any prior distributions over the mixture components. In other implementations, such as the VBGMM method (also in SKlearn) prior are placed over the means and covariance of the Gaussian components. This can guide the method toward more intuitive solutions, for example, if we know roughly the variance between data points in a single cluster.

A downside of the GMM approach is that we need to specify the number of clusters before we can perform inference. In our code, we mitigate this by optimizing the number of clusters, K, as follows:
  1. Normalize each column in the B matrix so that the values are scaled similarly. The normalized matrix is referred to as B'.
  2. Determine a set of possible values of K.
  3. For each possible value of K:
     a. Train a GMM using B'.
     b. Compute the Akaike information criterion (AIC).
  4. Choose the value of K that minimizes the AIC. Output predictions from the GMM with the optimal K.

The AIC is a measure of the quality of a model for a particular dataset. The AIC trades off between maximizing the log likelihood of the data given the model, and the model complexity: AIC=2k−2 ln(L), where k is the number of model parameters we have to estimate, and L is the log likelihood. This is similar to using the Bayesian information criterion (BIC), but penalizes models with a higher number of parameters less strongly. Theoretically, the AIC and BIC can be derived from Bayesian approaches but use different priors over the number of parameters. The AIC also has an information theoretic justification as it evaluates the amount of information lost by using our model of the data. In practice, we find that the AIC is better at finding intuitive numbers of clusters, whereas the BIC tends to lump all questions into one cluster. These methods may be more robust if we use to Bayesian method such as VBGMM because the priors over covariance guide the method toward particular cluster sizes.

We can avoid the task of optimizing by computing the AIC by using a Dirichlet process GMM (DPGMM). This is also available in the Python SKlearn packages. In the DPGMM, there is a Dirichlet process prior over the cluster membership of each point. In practice, when we perform inference over the DPGMM, it will instantiate new clusters when it sees data points that are not a good fit for the existing mixture components. Therefore, it automatically finds the number of clusters required to model a given dataset. The variational inference procedure used to infer clusters by the DPGMM is much more computationally efficient than running the standard GMM method multiple times for each possible number of clusters.

Experiments

We ran the clustering method on the B matrix described above. This simulation that allows us to determine whether we can recover the correct number of question clusters used to generate the data. We ran two simulations: the first of which generated latent question features (the latent skill requirements) from two clusters, and the second simulation used five clusters. We generated confusion matrices for 50 engines, who output between 1 and 50 items in each of 40 questions. The outputs could take any of 10 different values. Given this simulated data, we then ran TLIBCC. We then applied our clustering method to the inferred B matrix to produce the following results, which show the most likely cluster membership for each question.

The scenario with two true clusters is shown in FIG. 15. In this plot, the colors refer to the most likely cluster for each question, and the x and y axis show the expected values of the features inferred by TLIBCC. For a good clustering, we expect the questions with similar features to be placed in the same cluster, which we can see is the case above. We can see the clusters projected against the ground truth values of the latent question features for comparison as shown in FIG. 16. Both views show that the method correctly retrieved the clusters.

The scenario with five clusters is illustrated in FIG. 17. The data was grouped into four clusters by our method. The clusters appear to be intuitive when plotted against the first two latent features that were inferred. This suggests that our clustering method has done an acceptable job of retrieving the most natural clusters from the data we supplied, e.g., the inferred B matrix, even though it has produced one fewer than in the ground truth clustering.

The choice of the most intuitive number of clusters is a hard problem, and it is not easy to visualize the data when we have several features (five, in this case). A Bayesian approach such as the Dirichlet Process Gaussian Mixture Model ("DPGMM"), or the Variational Bayesian Gaussian Mixture Model ("VBGMM"), such as those in the sklearn library, could alleviate this problem and allow the user to specify informative priors over the number of clusters. For data exploration purposes there may not be a single meaningful clustering, so the user may choose to visualize the clusters plotted against different latent features, and compare the clusters produced with different values of K.

Clustering Engines

Engines may belong to different clusters depending on which type of question they are completing. For instance, for some questions, an engine may be highly competent, while for others they are not. Therefore, for each cluster of questions, we cluster the engines based on their abilities within that cluster of questions. This approach gives you a grouping of engines that is useful when considering the engine accuracy on a particular question. We could use engine clusters to provide insight into engine behavior, task difficulty and skills required for different questions.

As before, we used the GMM to cluster engines. As input to the model, we computed the latent matrix, G*BqT, where the matrix Bq contains all the rows from B for questions in the question cluster q. We assume that questions are hard-assigned to their most likely cluster, rather than taking a probabilistic weighting of cluster memberships.

The scenario with two clusters is illustrated with reference to FIGS. 18A and 18B. We show the clusters of engines produced for the two question clusters in the two-cluster experiment above. The plots below show the mean accuracy of the engines for questions within each question cluster. The colors indicate cluster membership. For both question clusters, the engines have been separated correctly into different clusters. We found that it is necessary to re-scale the data by a square of the number of questions for the AIC method to pick out intuitive clusters. In this case, we are clustering higher-dimensional data (on average twenty-five questions per cluster) and this may introduce some numerical errors when working with very small values. This is a heuristic that may need further refinement, depending on how the clustering method is to be applied. As before, the issue could be avoided through using VBGMM with an intuitive choice of priors over the cluster variance.

The scenario with five clusters is illustrated with reference to FIGS. 19A-19D. When there is a larger number of engine clusters and question clusters, the clusters found are harder to visualize and interpret. We show the accuracy plots in FIGS. 19A-19D for each of the four question clusters found. Note that in all of these plots, the engines with high mean accuracy within the cluster have successfully been grouped together. The number of clusters found was 8 for question clusters 0, 2 and 3, and 6 for question cluster 1. The clustering method therefore seems to have overfitted the data somewhat. A solution to this would be to use a Bayesian approach, such as the VBGMM or the DPGMM methods in SKlearn.

Ranking Engines

The file rank_analysis.py shows how to rank engines according to their accuracy on a particular question. First, we compute the latent value $\beta^*(wp)$ for each engine w on a question p:

$$\beta^*(wp)=G(w)^*B(p)+M(w).$$

Then we apply a standard sorting method to rank the engines.

We compare the rankings produced using the ground truth values for $\beta^*(wp)$, which we call the gold rankings, with the rankings produced using the values of $\beta^*(wp)$ inferred from simulated data. This experiment examines whether it is possible to recover the correct ordering of engines from the TLIBCC model inferred from engines' responses.

First, we look at the estimates of engine accuracy that we use to rank the engines. In the two-cluster scenario, the plot below shows the root mean squared error in the accuracies inferred by TLIBCC, compared to the ground truth values. Mostly, these are very small errors of less than 5%, as shown in FIG. 20A.

In the five-cluster scenario, the accuracies are also inferred with only small amounts of error, as shown in FIG. 20B. This shows that we are able to infer the engine accuracies given modest datasets.

We now compare the rankings produced using the ground truth engine accuracies with the rankings inferred by TLIBCC. We compare the results by computing Kendall's tau, which is a measure of rank correlation as shown in FIG. 21. The greater the number, the more the agreement between the predicted ranking and the ground truth. It is the equivalent of the area under the receiver operating characteristic curve (AUC) used to measure classification efficacy. However, tau can range between −1 and 1.

For the two-cluster scenario, we have strong correlations >0.6 for all questions. This means that there is a >80% chance of correctly selecting an engine in preference to another if we use this inferred ranking. The two-cluster scenario is shown in FIG. 20C.

FIG. 20D shows a similar plot for the five-cluster scenario. In this case, the values are higher for all but one question, with all but one >0.7, giving >85% chance of correct engine selection when choosing the better engine using this ranking.

In conclusion, the simulation suggests that it will be possible to select accurate engines using the inferred accuracy rankings from TLIBCC. When new engines are needed for a question, the ranking can be computed and the top N engines selected. This makes use of the latent features for both questions and engines, so that we can estimate the expected accuracy of an engine who has not yet worked on a particular question. Once the engine has completed tasks on their new question, we can recompute their ranking and determine whether they should be replaced by another engine, moved to a different question or retained.

Computer System

Figure 22:
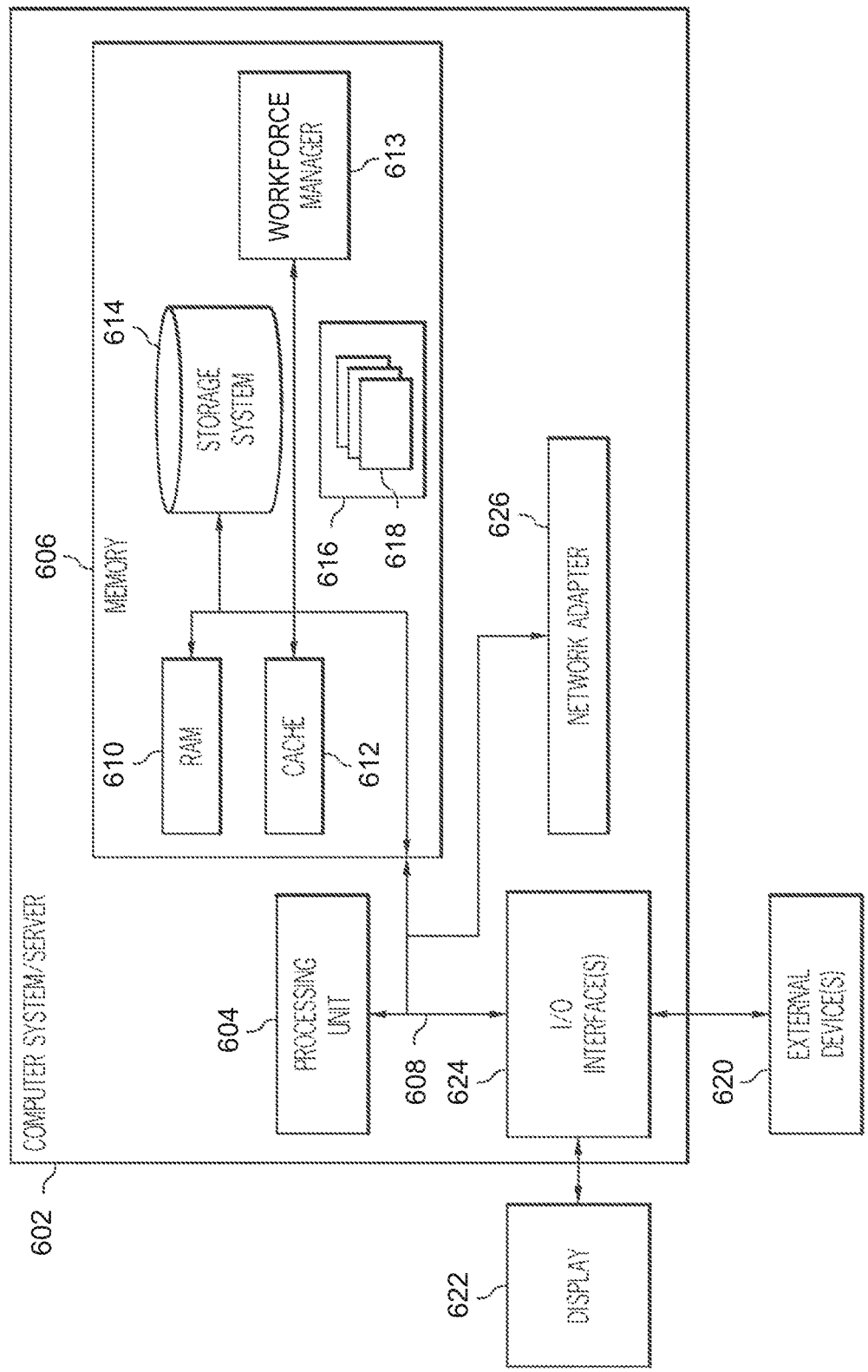
FIG. 22 illustrates an example of an information processing system, according to one or more embodiments.

Referring now to FIG. 22, a schematic of an example of an information processing system is shown, according to one or more embodiments. An information processing system 602 is one example of a suitable system and is not intended to suggest any limitation as to the scope of use or functionality of embodiments described herein. Regardless, information processing system 602 may implement and/or perform any one or more functionalities described herein.

Information processing system 602 may be or include one or more of a personal computer system, a server computer system, a workforce management server, a thin client, a thick client, a hand-held or laptop device, a tablet computing device, a multiprocessor system, a microprocessor-based system, a set top box, a programmable consumer electronic, a network PC, a minicomputer system, a mainframe computer system, and a distributed cloud computing system, among others. Information processing system 602 is shown in the form of a general-purpose computing device. Components of information processing system 602 may include one or more processors or processing units 604, a system memory 606 (e.g., one or more memory media), and a bus 608, among others, that couples various system components including the system memory 606 to the processor 604.

Bus 608 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. In one instance, bus 608 may represent one or more of a PCI-Express (PCIe) root complex and one or more PCIe switches, among others.

Information processing system 602 may include one or more computer system readable media. The one or more media may be any available media that is accessible by information processing system 602, which may include one or more volatile media, one or more non-volatile media, one or more removable media, and/or one or more non-removable media, among others. In one or more embodiments, system memory 606 may include one or more computer system readable media. For example, system memory 606 may be communicatively coupled to processing unit 604 and may store and/or include instructions executable by processing unit 604 that may be utilized in implementing one or more flowcharts, methods, processes, and/or system described herein.

As illustrated, system memory 606 may include a workforce manager 613. These one or more components may also be implemented in hardware as well. The system memory 606 may include computer system readable media in the form of volatile memory, such as random access memory (RAM) 610 and/or cache memory 612. The information processing system 602 may further include other removable/non-removable, volatile/non-volatile computer system storage media. By way of example only, a storage system 614 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 608 by one or more data media interfaces. As will be further depicted and described below, the memory 606 may include at least one program product having a set (e.g., at least one) of program modules that are configured to carry out the functions of various embodiments of the invention.

Program/utility 616, having a set (at least one) of program modules 618, may be stored in memory 606 by way of example, and not limitation, as well as an operating system, one or more application programs, other program modules, and program data. For instance, program modules 618 may include an engine management module, described herein. Each of the operating system, one or more application programs, other program modules, and program data or some combination thereof, may include an implementation of a networking environment. Program modules 618 generally carry out the functions and/or methodologies of various embodiments of the invention as described herein.

The information processing system 602 may also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication may occur via I/O interfaces 624. Still yet, the information processing system 602 may communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. It should be understood that although not shown, other hardware and/or software components could be used in conjunction with the information processing system 602. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The teachings of the present disclosure can be applied to a workflow management system For example, with reference to the features shown in FIG. 23, features in a workflow management system can include Task Features, HIT (Human Intelligence Task) features, Current Question/Answer Features, Previous Question/Answer Features, Question/Answer-level Worker Features, and Global Worker Features. While any relevant feature or attribute of any relevant phenomenon may be stored as a feature, a general listing of features is provided as an example.

Task Features
1. Task title—the title of the task.
2. Customer—the customer that initiated the task.
3. Created by—the handle of the person who created the task.
4. Tags—any tags set by author that describe the task.
5. Keywords—made available to the crowd workers to search for tasks.
6. Short Description—short abstract/description written for the task.
7. Question—the short text of the task question.
8. Qualification?—a binary flag indicating if this task required a worker qualification before starting.
9. Training?—was worker training required for the task.
10. FAQ/instructions—the text of any FAQ/instructions for this task.
11. HIT count—the total number of HIT in this task.
12. Messages/questions—count of how many messages/questions were sent for this task in total.
13. Use-case category—category set by the creator of the task as part of Task ontology.
14. Use-case—specific use-case of the task as part of Task ontology.
15. Number of questions—the number of questions per HIT on this task.
16. Average different answers—the average number of different answers per question on the task. So if all workers answer all questions the same the data here would be '1'. If some workers provide different answers then the value would be <1.
17. Percent of records delivered—how many of the total records were delivered to the customer. (Accepted=true).
18. Time before first accept—How long after publishing the task was the first HIT accepted. HIT Features
1. Blocksize—The total number of questions in this HIT.
2. Cost—the pay out for this HIT.
3. Accepted—the total number of times this HIT was accepted.
4. Skipped—the number of times this HIT was skipped.
5. Complete—the number of workers that fully completed the HIT
6. Returned—the number of workers that didn't finish the HIT.
7. Time before returned—the total time spent on the HIT before it was returned.
8. Messages/questions—how many messages/questions were asked for this HIT.

Current Question/Answer Features
1. Current question type.
2. Questions remaining—The total number of questions that remain unanswered on the HIT after this question has been answered.
3. Question difficulty—measured by ART.
4. Is difficult?—if the difficulty of the question is >the average question difficulty.
5. Percentage of correct answers—the total number of correct answers/all attempted answers.
6. Percent of incorrect answers—the total number of incorrect answers/all attempted answers.
7. Question-level Average response time (ART)—the ART for this question over all workers.
8. Worker ART comparison—if the ART for this question is >the worker ART
9. 'Silver Worker' automated answer—if automation is available then the posterior probability of the ML model.
10. FAQs?—if any workers asked questions asked about the current question.
11. Answer name—the name of the answer.
12. Answer type—the type of answer for the question.
13. Answer description—any description of the answer.
14. Required?—was this answer required.
15. hasDefault?—if the answer has a default value.
16. Default value—the given default value for this answer.
17. Average different answers—the average number of different answers for this question.
18. Document length—The length of the document for which the question is being asked about.
19. Relative answer position—The relative position of the answer(s) in the current document. The index of the start of the answer is normalized by the document length.
20. Length of the input document for the tasks, e.g., size of the document to be used to perform information extraction
21. Relative start position of the answer in the document text as indicated by worker (i.e., what position in the document the beginning of the answer is).

Previous Question/Answer Features
1. Previous question types.
2. Previous question difficulty—how difficult was the last question answered.
3. Is previous question difficult—if the difficulty of the last question is >the average question difficulty.
4. Combined difficulty—if the last question and current question difficulties are both >the average question difficulty.
5. Previous correct—was the previous question answered correctly?
6. Previous skipped—was the previous question skipped?
7. Previous 'Silver Worker' answer—if automation is available then the posterior probability of the prior question from the model.
8. An additional 32 features that are the same as all above items for the last 5 questions answered.

Question/Answer-level Worker Features
1. Worker ART—the ART for this worker.
2. ART ratio—the ART of this worker/the sum of ART for all workers
3. Number of correct answers so far.
4. Number of incorrect answers so far.
5. Number of questions left out so far.
6. Number of answers that matched the gold.
7. Number of correct answers so far/Number of incorrect answers so far.
8. Number of questions left out so far/Number of correct answers so far.
9. Number of incorrect answers so far/Number of correct answers so far.
10. Number of answers that matched gold/Total number of answers submitted.
11. Current task earnings—the amount the worker has earned so far on this task.
12. Current worker rank—the rank of the worker after completing the question.

Global Worker Features
1. Task Total—total number of tasks the worker has completed prior to this one.
2. Qualifications achieved—total number of tasks the worker has qualified for.
3. Qualifications attempted—total number of tasks the worker has attempted to be qualified for.
4. Average qualification score—the average score for all qualifications undertaken.
5. Number of qualifications achieved >=90.
6. Number of qualifications achieved >=80<90.
7. Number of qualifications <80.
8. Tiers of matching qualifications—how many of the same qualification has the worker achieved. We need to compute this as it's not in the system now.
9. Qualification level degraded—the amount of qualification score that the worker has fallen over time.
10. Historical accuracy—the historical accuracy of the worker over all completed tasks.
11. Historical gold accuracy—this historical gold accuracy of the worker over all completed tasks.
12. Historical worker rank—the rank of the worker on all prior tasks.
13. Messages/questions—how many messages/questions did this worker ask in total.
14. Bonus Amount—total amount of bonus money paid to the worker.
15. Percent correct per use-case category—total percent correct over all use-case categories the worker has completed.
16. Percent correct per use-case—total percent correct over all use-cases.
17. Average time per day—how many hours per day the worker spends on tasks on average.
18. Average time per task—how much time the worker spends per task on average.
19. Average time per category—how much time the worker spends per category on average.
20. Average time per use-case—how much time the worker spends per use-case on average.
21. Time away—time since the last task accepted.
22. Number of messages—how many times the worker received messaged by the task creator.
23. Worker country—the country the worker is working in.

In certain embodiments, a "task" may include collection of actions to be performed by workers. The result of the workers performing these requested actions may be referred to as the "output" or "result" of the task, the "work product" of a worker", or the "solution" to the problem. Tasks may also be described as a collection of "questions," each question having an "answer" supplied by the worker (e.g., either an automated or machine worker/process or "human" worker). A human task (i.e., "human implemented task" or "HIT") describes a task that is assigned for completion by a human worker. In certain embodiments, tasks may be assigned for an automated process that completes tasks based on a "learned" method programmed, in some cases, using training data compiled from manually completed HIT. A "project" refers to multiple related tasks.

Figure 24:
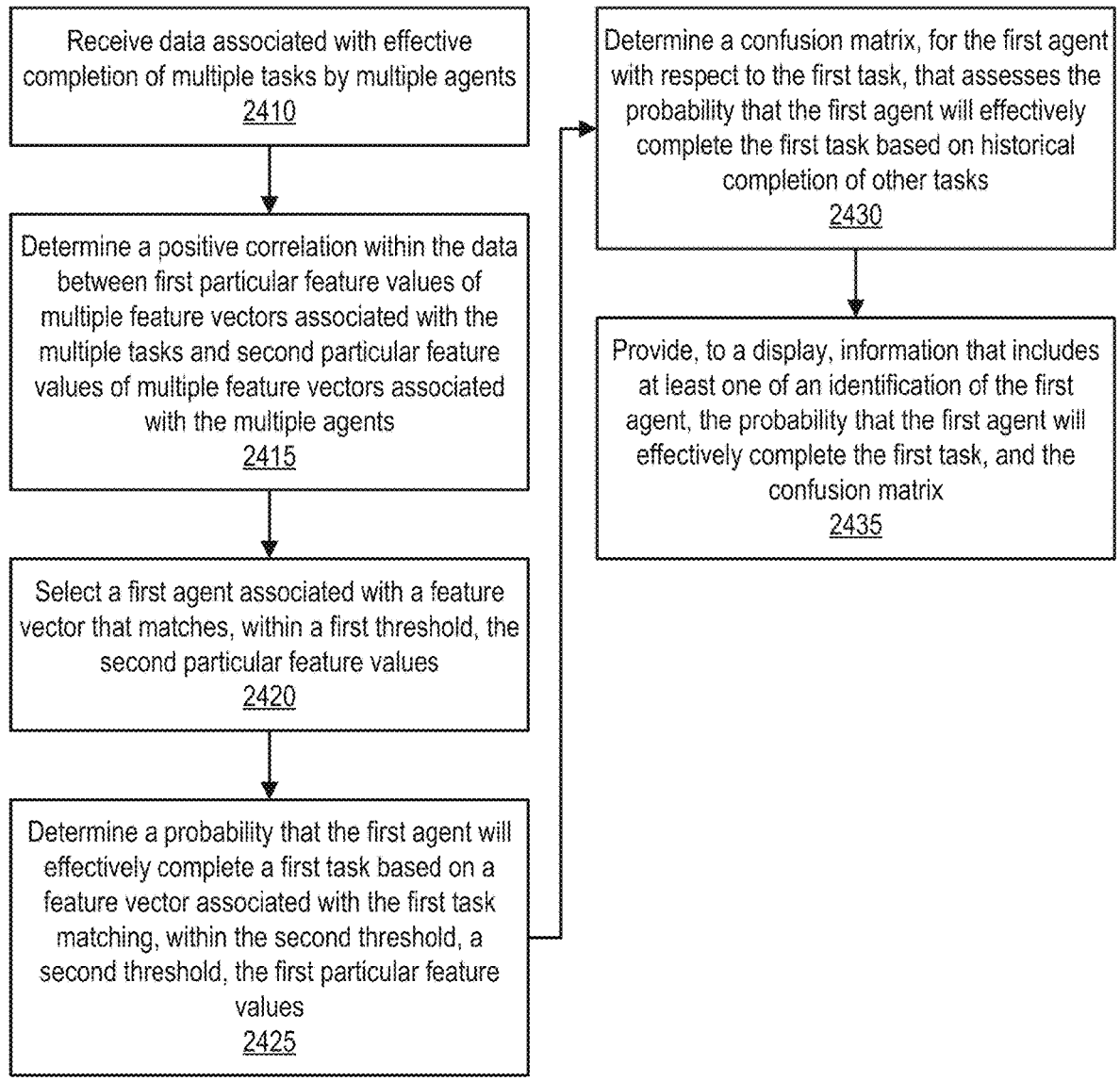
FIG. 24 illustrates a method of determining a probability that an agent will effectively complete a task, according to one or more embodiments.

Turning now to FIG. 24, a method of determining a probability that an agent will effectively complete a task is illustrated, according to one or more embodiments. At 2410, data associated with effective completion of multiple tasks by multiple agents may be received. For example, computer system 602 may receive the data associated with effective completion of the multiple tasks by the multiple agents. For instance, computer system 602 may receive the data from a network. In one or more embodiments, a network may include one or more of a wired network, a wireless network, and an optical network, among others. For example, the network may include one or more of a wide area network (WAN), a local area network (LAN), a wireless LAN (WLAN), a public WAN (e.g., an Internet), a private WAN, a public switched telephone network (PSTN), a cellular telephone network, a satellite telephone network, and a metropolitan area network (MAN), among others. In one or more embodiments, the network may be coupled to one or more other networks. For example, the network may be coupled to one or more of a WAN, a LAN, a WLAN, a public WAN, a private WAN, a PSTN, a cellular telephone network, a satellite telephone network, and a MAN, among others.

At 2415, a positive correlation within the data between first particular feature values of multiple feature vectors associated with the multiple tasks and second particular feature values of multiple feature vectors associated with the multiple agents may be determined. For example, computer system 602 may determine the positive correlation within the data between the first particular feature values of the multiple feature vectors associated with the multiple tasks and the second particular feature values of the multiple feature vectors associated with the multiple agents. In one instance, the multiple vectors associated with the multiple tasks may assess a set of skill requirements for completing each task of the multiple tasks. In another instance, the multiple feature vectors associated with the multiple agents may assess a set of skills attributable to each agent of the multiple agents.

In one or more embodiments, the multiple tasks may include requests. In one example, the requests may include requests for a particular type of product. In another example, the requests may include requests to identify a dividend announcement in a financial filing document. In one or more embodiments, the multiple agents may include workers. In one example, the workers may include one or more human workers. In another example, the workers may include one or more machine workers (e.g., one or more computer workers).

In one or more embodiments, the multiple agents may include one or more engines running on shopping websites. In one or more embodiments, determining the positive correlation may include one or more of assessing a level of effectiveness with which each of the multiple tasks was completed, selecting a first set of the multiple tasks that was most effectively completed, determining similar feature values among agents that completed each task in the first set, and determining similar feature values among tasks in the first set, among others.

At 2420, a first agent associated with a feature vector that matches, within a first threshold, the second particular feature values may be selected. For example, computer system 602 may select the first agent associated with the feature vector that matches, within the first threshold, the second particular feature values. At 2425, a probability that the first agent will effectively complete a first task based on a feature vector associated with the first task matching, within a second threshold, the first particular feature values may be determined. For example, computer system 602 may determine the probability that the first agent will effectively complete the first task based on the feature vector associated with the first task matching, within the second threshold, the first particular feature values. In one or more embodiments, determining the probability may include deriving a scalar product between the first agent's feature values corresponding to the first particular feature values and the second agent's feature values corresponding to the second particular feature values.

At 2430, a confusion matrix, for the first agent with respect to the first task, that assesses the probability that the first agent will effectively complete the first task based on historical completion of other tasks may be determined. For example, computer system 602 may determine the confusion matrix, for the first agent with respect to the first task, that assesses the probability that the first agent will effectively complete the first task based on the historical completion of the other tasks. For instance, the other tasks may be associated with feature vectors that match, within the second threshold, the first particular feature values.

At 2435, information that includes at least one of an identification of the first agent, the probability that the first agent will effectively complete the first task, and the confusion matrix may be provided to a display. For example, computer system 602 may provide, to a display, the information that includes the at least one of an identification of the first agent, the probability that the first agent will effectively complete the first task, and the confusion matrix. In one instance, computer system 602 may provide, to display 622, the information that includes the at least one of an identification of the first agent, the probability that the first agent will effectively complete the first task, and the confusion matrix. In another instance, computer system 602 may provide, to a display coupled to a network, the information that includes the at least one of an identification of the first agent, the probability that the first agent will effectively complete the first task, and the confusion matrix. In one or more embodiments, the display coupled to the network may be coupled to another computer system that is coupled to the network.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof.

This disclosure has been presented for purposes of illustration and description, but is not intended to be exhaustive or limited to the form(s) disclosed. Modifications and variations will be apparent to those of ordinary skill in the art without departing from the scope and spirit of the disclosed embodiments. Exemplary embodiments were chosen and described in order to explain principles and application(s), and to enable others of ordinary skill in the art to understand the embodiments with modifications as are suited to the particular use contemplated.

What is claimed is:

1. A method comprising:
receiving data associated with historical completion of a plurality of tasks by a plurality of agents, wherein each task of the plurality of tasks corresponds to one or more categories of tasks and is associated with an outcome relative to satisfaction of a specification of performance by a work distributor;
training an aptitude prediction model to map, for each of the one or more categories, a correlation between one or more aspects of each task corresponding to the category and one or more attributes of each agent of the plurality of agents based on the received data associated with historical completion of the plurality of tasks by the plurality of agents;
determining, using the aptitude prediction model, for each of the one or more categories, a skill aptitude of each agent of the plurality of agents towards the category, wherein the aptitude prediction model computes the skill aptitude of the agent towards the category based at least in part on the data associated with historical completion of one or more of the plurality of tasks by the agent;
selecting, among the plurality of agents, a first agent that has higher skill aptitude towards a first category than other agents within the plurality of agents, wherein a first task corresponds to the first category;
determining a probability that the first agent will complete the first task in a manner specified by the work distributor using the trained aptitude prediction model, the first category of the first task, one or more aspects of the first task, and one or more attributes of the first agent; and
providing identification information of the first agent for display in association with the determined probability.

2. The method of claim 1, wherein the aptitude prediction model comprises a plurality of weak classifiers, each weak classifier being trained to predict a skill aptitude of an agent based on a subset of the one or more aspects of each task corresponding to the category or one or more attributes of each agent that has completed the task.

3. The method of claim 2, wherein training the aptitude prediction model comprises aggregating the plurality of weak classifiers such that a predictive capability of the aggregated plurality of weak classifiers is more accurate that a predictive capability of any one of the plurality of weak classifiers independently.

4. The method of claim 1, further comprising training a machine-learning model to perform a category of tasks using the data associated with historical completion of the plurality of tasks by the plurality of agents, wherein the first agent is the trained machine-learning model.

5. The method of claim 4, further comprising selecting output from a particular agent of the plurality of agents as training data, wherein the particular agent is determined, using the aptitude prediction model, to have a high skill aptitude for completing the category of tasks to satisfaction of the specification of performance by the work distributor.

6. The method of claim 1, further comprising converting the one or more aspects of each task and the one or more attributes of each agent to a respective feature vector prior to training the aptitude prediction model.

7. The method of claim 6, wherein determining the probability that the first agent will complete the first task in the manner specified by the work distributor comprises deriving a scalar product between a feature vector associated with the first agent and a feature vector associated with the first task.

8. The method of claim 6, wherein the feature vector associated with each task comprises feature values characterizing the task and the feature vector associated with each agent comprises feature values characterizing the agent.

9. The method of claim 1, wherein training the aptitude prediction model comprises:
assessing a level of effectiveness with which each task of the plurality of tasks was completed;
selecting a first set of the plurality of tasks that was most effectively completed;
determining similar aspects among tasks in the first set; and
determining similar attributes among agents that completed each task in the first set.

10. The method of claim 9, wherein the aspects of each task in the first set are represented by a respective feature vector and the attributes of each agent that complete each task in the first set are represented by a respective feature vector; and
wherein determining the similar aspects comprises minimizing a scalar product among the feature vectors representing the tasks and determining the similar attributes comprises minimizing a scalar product among the feature vectors representing the agents.

11. The method of claim 1, wherein the first task corresponds to a product identification request, the one or more aspects of the first task comprise a price, intrinsic product characteristics, or user-generated product characteristics, and wherein the attributes of the first agent comprise speed of recommended results or a measure of user satisfaction.

12. The method of claim 1, wherein the first task corresponds to a search query and the plurality of agents comprises a plurality of search engines.

13. The method of claim 1, wherein the specification of performance by the work distributor comprises prioritization of one or more of:
fast return of results from an agent to which a task is assigned;
accurate results from the agent to which the task is assigned; or
correct output associated with the task.

14. One or more computer-readable non-transitory storage media including instructions that, when executed by one or more processors of a computing system, are configured to cause the computing system to perform operations comprising:
receiving data associated with historical completion of a plurality of tasks by a plurality of agents, wherein each task of the plurality of tasks corresponds to one or more categories of tasks and is associated with an outcome relative to satisfaction of a specification of performance by a work distributor;
training an aptitude prediction model to map, for each of the one or more categories, a correlation between one or more aspects of each task corresponding to the category and one or more attributes of each agent of the plurality of agents based on the received data associated with historical completion of the plurality of tasks by the plurality of agents;
determining, using the aptitude prediction model, for each of the one or more categories, a skill aptitude of each agent of the plurality of agents towards the category, wherein the aptitude prediction model computes the skill aptitude of the agent towards the category based at least in part on data associated with one or more historical completion of one or more of the plurality of tasks by the agent;

selecting, among the plurality of agents, a first agent that has higher skill aptitude towards a first category than other agents within the plurality of agents, wherein a first task corresponds to the first category;

determining a probability that the first agent will complete the first task in a manner specified by the work distributor using the trained aptitude prediction model, the first category of the first task, one or more aspects of the first task, and one or more attributes of the first agent; and providing identification information of the first agent for display in association with the determined probability.

15. The one or more computer-readable non-transitory storage media of claim 14, wherein the aptitude prediction model comprises a plurality of weak classifiers, each weak classifier being trained to predict a skill aptitude of an agent based on a subset of the one or more aspects of each task corresponding to the category or one or more attributes of each agent that has completed the task.

16. The one or more computer-readable non-transitory storage media of claim 15, wherein the instructions configured to cause the computing system to train the aptitude prediction model further comprise instructions configured to cause the computing system to perform further operations comprising aggregating the plurality of weak classifiers such that a predictive capability of the aggregated plurality of weak classifiers is more accurate that a predictive capability of any one of the plurality of weak classifiers independently.

17. The one or more computer-readable non-transitory storage media of claim 14, wherein the instructions are further configured to cause the computing system to perform further operations comprising training a machine-learning model to perform a category of tasks using the data associated with historical completion of the plurality of tasks by the plurality of agents, wherein the first agent is the trained machine-learning model.

18. A system comprising: one or more processors; and one or more computer-readable non-transitory storage media in communication with the one or more processors and comprising instructions that, when executed by the one or more processors, are configured to cause the system to perform operations comprising:

receiving data associated with historical completion of a plurality of tasks by a plurality of agents, wherein each task of the plurality of tasks corresponds to one or more categories of tasks and is associated with an outcome relative to satisfaction of a specification of performance by a work distributor;

training an aptitude prediction model to map, for each of the one or more categories, a correlation between one or more aspects of each task corresponding to the category and one or more attributes of each agent of the plurality of agents based on the received data associated with historical completion of the plurality of tasks by the plurality of agents;

determining, using the aptitude prediction model, for each of the one or more categories, a skill aptitude of each agent of the plurality of agents towards the category, wherein the aptitude prediction model computes the skill aptitude of the agent towards the category based at least in part on data associated with one or more historical completion of one or more of the plurality of tasks by the agent;

selecting, among the plurality of agents, a first agent that has higher skill aptitude towards a first category than other agents within the plurality of agents, wherein a first task corresponds to the first category;

determining a probability that the first agent will complete the first task in a manner specified by the work distributor using the trained aptitude prediction model, the first category of the first task, one or more aspects of the first task, and one or more attributes of the first agent; and providing identification information of the first agent for display in association with the determined probability.

19. The system of claim 18, wherein the aptitude prediction model comprises a plurality of weak classifiers, each weak classifier being trained to predict a skill aptitude of an agent based on a subset of the one or more aspects of each task corresponding to the category or one or more attributes of each agent that has completed the task.

20. The system of claim 19, wherein the instruction configured to cause the system to train the aptitude prediction model are further configured to cause the system to perform further operations comprising aggregating the plurality of weak classifiers such that a predictive capability of the aggregated plurality of weak classifiers is more accurate that a predictive capability of any one of the plurality of weak classifiers independently.

21. The method of claim 1, wherein a skill aptitude of an agent towards a category of task represents a level of skills, special functions, optimizations, and capabilities to complete the category of task in a desired manner.

22. The method of claim 1, further comprising:
determining a confusion matrix for the first agent with respect to the first task assessing the probability that the first agent will complete the first task in a manner specified by the work distributor based on historical completion of other tasks in the first category; and
providing the confusion matrix for display.

* * * * *